US011014216B2

(12) United States Patent
Takeda

(10) Patent No.: US 11,014,216 B2
(45) Date of Patent: May 25, 2021

(54) WORKPIECE HOLDING TOOL CHANGING SYSTEM FOR A WORKPIECE CONVEYING APPARATUS OF A TRANSFER PRESS MACHINE

(71) Applicant: AIDA ENGINEERING, LTD., Kanagawa (JP)

(72) Inventor: Keisuke Takeda, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 429 days.

(21) Appl. No.: 16/168,509

(22) Filed: Oct. 23, 2018

(65) Prior Publication Data

US 2019/0126340 A1 May 2, 2019

(30) Foreign Application Priority Data

Oct. 27, 2017 (JP) ............................ JP2017-208204
Apr. 27, 2018 (JP) ............................ JP2018-086544

(51) Int. Cl.
*B23Q 1/00* (2006.01)
*B25B 5/00* (2006.01)
(Continued)

(52) U.S. Cl.
CPC ............ *B25B 5/003* (2013.01); *B21D 43/055* (2013.01); *B21D 43/057* (2013.01);
(Continued)

(58) Field of Classification Search
CPC . B21D 1/00; B21D 3/00; B21D 22/00; H05K 3/00; H05K 13/00; B30B 1/00;
(Continued)

(56) References Cited

U.S. PATENT DOCUMENTS 4,753,103 A 6/1988 Braun
8,899,291 B2 * 12/2014 Yasumoto .............. B32B 37/10 156/381
(Continued)

FOREIGN PATENT DOCUMENTS

JP S59-49429 A 4/1984
JP S64-22428 A 1/1989
(Continued)

OTHER PUBLICATIONS

Notice of Reasons for Refusal issued in corresponding Japanese Patent Application No. 2018-086544, dated Apr. 15, 2020, with Englsih translation.
Extended European Search Report dated Mar. 4, 2019, issued in European Application No. 18202755.7.

*Primary Examiner* — Lee D Wilson
(74) *Attorney, Agent, or Firm* — McDermott Will & Emery LLP

(57) ABSTRACT

Provided is a workpiece holding tool changing system configured to change at least one of a relative position and a posture of a holding tool of a workpiece conveying apparatus with respect to a feed bar. The feed bar includes at least one set among: an X-axis direction linear mechanism with an X-axis linear brake; a Y-axis direction linear mechanism with a Y-axis linear brake; a Z-axis direction linear mechanism with a Z-axis linear brake; and a ball joint portion and a ball brake. Under a state in which inhibition of movement or change in posture by a corresponding brake is canceled, a robot changes the relative position or the posture of the holding tool to a desired relative position or a desired posture. After the change, the workpiece holding tool changing system is brought into a holding state in which the movement or the change in posture is inhibited.

10 Claims, 18 Drawing Sheets

(51) Int. Cl.

| | |
|---|---|
| ***B21D 43/05*** | (2006.01) |
| ***B25B 5/02*** | (2006.01) |
| ***B25B 5/04*** | (2006.01) |
| ***B21D 43/10*** | (2006.01) |
| ***B30B 15/14*** | (2006.01) |
| *B25B 11/00* | (2006.01) |
| *B21D 43/18* | (2006.01) |
| *B30B 15/04* | (2006.01) |

(52) U.S. Cl.
CPC ............ *B21D 43/105* (2013.01); *B25B 5/006* (2013.01); *B25B 5/02* (2013.01); *B25B 5/04* (2013.01); *B30B 15/142* (2013.01); *B21D 43/18* (2013.01); *B25B 11/00* (2013.01); *B30B 15/041* (2013.01)

(58) Field of Classification Search
CPC .... B30B 5/00; B30B 7/00; B23Q 3/00; B23Q 3/06; B23P 19/04; B23P 19/10
See application file for complete search history.

(56) References Cited

U.S. PATENT DOCUMENTS

| | | | | |
|---|---|---|---|---|
| 2008/0216547 | A1* | 9/2008 | Kong | B21D 43/05 72/405.13 |
| 2012/0163390 | A1 | 6/2012 | Iovanna et al. | |
| 2016/0288194 | A1 | 10/2016 | Buchner et al. | |
| 2019/0126340 | A1* | 5/2019 | Takeda | B25B 5/04 |

FOREIGN PATENT DOCUMENTS

| | | | |
|---|---|---|---|
| JP | H5-228778 | A | 9/1993 |
| JP | H05-228778 | A | 9/1993 |
| JP | H06-63668 | A | 3/1994 |
| JP | 2004-050263 | A | 2/2004 |
| JP | 2005-177770 | A | 7/2005 |
| JP | 2007-38302 | A | 2/2007 |
| WO | 99/47449 | A1 | 9/1999 |
| WO | 2012/163390 | A1 | 12/2012 |

* cited by examiner (STEP 2)

(STEP 3)

(STEP 5)

(STEP 7)

(STEP 3)

WORKPIECE HOLDING TOOL CHANGING SYSTEM FOR A WORKPIECE CONVEYING APPARATUS OF A TRANSFER PRESS MACHINE

CROSS REFERENCE

This application claims the benefit of Japanese Application No. 2017-208204, filed on Oct. 27, 2017 and Japanese Application No, 2018-086544, filed on Apr. 27, 2018, the entire contents of each are hereby incorporated by reference in their entirety.

BACKGROUND OF THE INVENTION

1. Field of the Invention

The present invention relates to a workpiece holding tool changing system for a workpiece conveying apparatus of a transfer press machine.

2. Description of the Related Art

As a workpiece (material) conveying apparatus of a transfer press machine in which a plurality of multi-process (multiple) dies are arranged side by side in a workpiece conveying direction for one slide and bolster, there is known a workpiece conveying apparatus configured to sequentially convey a workpiece between the multi-process (multiple) dies from a die on upstream to a die on downstream.

For example, a related-art transfer press machine performs transfer working as follows. As illustrated in FIG. 12, two feed bars 10A and 10B extending in the workpiece conveying direction and being arranged so as to be opposed to each other approach, from both sides, a workpiece (material) that is in the middle of being formed at each stage (illustrated from 1st.stg to 6th.stg in FIG. 12) in the multi-process so that the workpiece in each process is clamped (supported or held) by fingers 20A to 25A and 20B to 25B. Under this state, the transfer press machine repeats operations of lift, advance (movement to the downstream in the workpiece conveying direction), and down, and then operations of unclamp (separate the feed bars 10A and 10B away from each other to release the workpiece) and return (return to an original upstream position in the workpiece conveying direction) so as to convey the workpiece between the respective stages.

Further, in Patent Literature 1, as illustrated in FIG. 13, there is described a workpiece conveying apparatus including feed bars 39 and fingers 44 and being configured to convey a workpiece by achieving a three-dimensional motion (above-mentioned operations of clamp, lift, advance, down, and unclamp) by first carriages 41 configured to move in a region between press stations, second carriages 43 configured to move in a direction orthogonal to a press line, and raising/lowering drive apparatus 45.

Patent Literature 1 here corresponds to Japanese Patent Application Laid-open No. 2004-50263.

In the related-art workpiece conveying apparatus described above, the two feed bars require a plurality of fingers corresponding to respective stages in order to hold workpieces having different shapes, sizes, or the like corresponding to the respective stages.

Therefore, when the die is changed to change the size, the shape, or the like of the workpiece in each process, the fingers are required to be replaced in accordance with the changed size, shape, or the like of the workpiece.

However, in such a case, the following problems are assumed to occur.

(A) Causing Reduction in Production Efficiency

Time is required for an operation of replacing individual fingers such as removing original fingers from the feed bars and replacing the original fingers with different fingers. As a result, the time of stopping the press line is increased. Stopping the press line for a long time period is disadvantageous in terms of enhancement in production efficiency.

(B) Causing Increase in Cost and Storage Space

Respective workpieces having different processing shapes and sizes require dedicated fingers having positions and postures corresponding to the workpieces, and hence the cost may be increased.

Further, a space for storing a plurality of different types of fingers is required, and hence space saving in a production plant is hindered.

(C) Causing Mistakes, Etc. Due to Complicated Replacement Operation

When the replacement operation is manually performed, erroneous tool replacement may be performed due to inattention of an operator.

Therefore, the conveyed workpiece may be failed to be clamped, which may cause conveyance operation stop (stop of a production line) or the like.

In view of the above, it is also conceivable to eliminate the replacement of the fingers by adopting a configuration in which each conveying tool including the fingers itself includes a drive mechanism for tool (finger) posture change.

However, when the individual conveying tool includes the drive mechanism, the weight and the load applied to the feed bar are increased. Thus, there arise such a problem that lifetime of the conveying apparatus for a transfer press machine is shortened (durability is reduced) and such a problem that it becomes difficult to increase a conveyance speed due to the increase in weight of the feed bar (movable portion).

SUMMARY OF THE INVENTION

Therefore, according to one aspect of the present invention, provided is a workpiece holding tool changing system for a workpiece conveying apparatus of a transfer press machine, the workpiece holding tool changing system being configured to change at least one of a relative position and a posture of a workpiece holding tool with respect to a feed bar, the workpiece holding tool being configured to hold a workpiece, the feed bar including at least one workpiece holding tool along a long-axis direction of the feed bar, the feed bar further including, for each workpiece holding tool, at least one set among: a set of an X-axis direction linear-motion mechanism configured to guide movement of the workpiece holding tool with respect to the feed bar in an X-axis direction corresponding to a feed direction of the workpiece and an X-axis direction movement inhibition mechanism configured to inhibit the movement; a set of a Y-axis direction linear-motion mechanism configured to guide movement of the workpiece holding tool with respect to the feed bar in a Y-axis direction corresponding to a clamp direction and a Y-axis direction movement inhibition mechanism configured to inhibit the movement; a set of a Z-axis direction linear-motion mechanism configured to guide movement of the workpiece holding tool with respect to the feed bar in a Z-axis direction corresponding to a vertical direction and a Z-axis direction movement inhibition mechanism configured to inhibit the movement; and a set of a posture changing mechanism configured to change the posture of the workpiece holding tool with respect to the feed bar and a posture change inhibition mechanism configured to inhibit the change in posture, wherein, under a state in which inhibition of one of the movement and the change in posture by one of corresponding one movement inhibition mechanism and the posture change inhibition mechanism is canceled, a workpiece holding tool changing apparatus provided separately from the feed bar changes one of the relative position and the posture of the workpiece holding tool to one of a desired relative position and a desired posture with respect to the feed bar, and wherein, after the change, the workpiece holding tool changing system is brought into a holding state in which the one of the movement and the change in posture is inhibited by the one of the corresponding one movement inhibition mechanism and the posture change inhibition mechanism.

Further, according to another aspect of the present invention, provided is a workpiece holding tool changing system for a workpiece conveying apparatus of a transfer press machine, the workpiece holding tool changing system being configured to change at least one of a relative position and a posture of a workpiece holding tool with respect to a feed bar, the workpiece holding tool being configured to hold a workpiece, the feed bar including at least one workpiece holding tool along a long-axis direction of the feed bar, the feed bar further including, for each workpiece holding tool, a set of an X-axis direction linear-motion mechanism configured to guide movement of the workpiece holding tool with respect to the feed bar in an X-axis direction corresponding to a feed direction of the workpiece and an X-axis direction movement inhibition mechanism configured to inhibit the movement, each workpiece holding tool being supported by the feed bar via: a first arm having a proximal end portion that is supported by a first-arm support base supported by the X-axis direction linear-motion mechanism, so as to be swingable in a substantially vertical plane via a first joint; a second arm having a proximal end portion that is supported on a distal end side of the first arm so as to be swingable in the substantially vertical plane via a second joint; and a posture changing mechanism provided on a distal end side of the second arm and configured to change the posture of the workpiece holding tool with respect to the feed bar, each workpiece holding tool including: a first-arm swinging inhibition mechanism configured to inhibit swinging of the first arm about the first joint; a second-arm swinging inhibition mechanism configured to inhibit swinging of the second arm about the second joint; and a posture change inhibition mechanism configured to inhibit change in posture by the posture changing mechanism, wherein, under a state in which inhibition of the movement, the swinging, and the change in posture by the X-axis direction movement inhibition mechanism, the first-arm swinging inhibition mechanism, the second-arm swinging inhibition mechanism, and the posture change inhibition mechanism is canceled, a workpiece holding tool changing apparatus provided separately from the feed bar changes one of the relative position and the posture of the workpiece holding tool to one of a desired relative position and a desired posture with respect to the feed bar, and wherein, after the change, the workpiece holding tool changing system is brought into a holding state in which the movement, the swinging, and the change in posture are inhibited by the X-axis direction movement inhibition mechanism, the first-arm swinging inhibition mechanism, the second-arm swinging inhibition mechanism, and the posture change inhibition mechanism.

Further, according to still another aspect of the present invention, provided is a workpiece holding tool changing system for a workpiece conveying apparatus of a transfer press machine, the workpiece holding tool changing system being configured to change at least one of a relative position and a posture of a workpiece holding tool with respect to a feed bar, the workpiece holding tool being configured to hold a workpiece, the feed bar including at least one workpiece holding tool along a long-axis direction of the feed bar, the feed bar further including, for each workpiece holding tool, a set of a rotation support mechanism configured to support the workpiece holding tool in a freely rotatable manner in a plane substantially parallel to one of a substantially horizontal plane and a substantially vertical plane of the feed bar and a rotation inhibition mechanism configured to inhibit the rotation, each workpiece holding tool being supported by the feed bar via: a first arm having a proximal end portion that is supported by a first-arm support base supported by the rotation support mechanism, so as to be swingable in the substantially vertical plane via a first joint; a second arm having a proximal end portion that is supported on a distal end side of the first arm so as to be swingable in the substantially vertical plane via a second joint; and a posture changing mechanism provided on a distal end side of the second arm and configured to change the posture of the workpiece holding tool with respect to the feed bar, each workpiece holding tool including: a first-arm swinging inhibition mechanism configured to inhibit swinging of the first arm about the first joint; a second-arm swinging inhibition mechanism configured to inhibit swinging of the second arm about the second joint; and a posture change inhibition mechanism configured to inhibit change in posture by the posture changing mechanism, wherein, under a state in which inhibition of the rotation, the swinging, and the change in posture by the rotation inhibition mechanism, the first-arm swinging inhibition mechanism, the second-arm swinging inhibition mechanism, and the posture change inhibition mechanism is canceled, a workpiece holding tool changing apparatus provided separately from the feed bar changes one of the relative position and the posture of the workpiece holding tool to one of a desired relative position and a desired posture with respect to the feed bar, and wherein, after the change, the workpiece holding tool changing system is brought into a holding state in which the rotation, the swinging, and the change in posture are inhibited by the rotation inhibition mechanism, the first-arm swinging inhibition mechanism, the second-arm swinging inhibition mechanism, and the posture change inhibition mechanism.

In the present invention, the workpiece holding tool changing apparatus is configured to change one of the relative position and the posture of a corresponding workpiece holding tool to one of a desired relative position and a desired posture with respect to the feed bar through engagement with a single engaging portion of the corresponding workpiece holding tool.

In the present invention, the transfer press machine includes a moving bolster, and, under a state in which the moving bolster and the feed bar are removed from the transfer press machine to an outside, the workpiece holding tool changing apparatus changes one of the relative position and the posture of the workpiece holding tool to one of the desired relative position and the desired posture with respect to the feed bar, and the workpiece holding tool changing system is shifted to the holding state after the change.

DESCRIPTION OF THE EMBODIMENTS

Now, with reference to the accompanying drawings, description is made of a workpiece holding tool changing system for a workpiece conveying apparatus of a transfer press machine according to embodiments of the present invention. The present invention is not limited to the embodiments described below.

The present invention has been made in view of the above-mentioned circumstances, and has an object to provide a workpiece holding tool changing system for a workpiece conveying apparatus of a transfer press machine, which is capable of rapidly and accurately changing a position and a posture of a workpiece holding tool (workpiece holding apparatus) with respect to a feed bar in accordance with specifications (such as a shape, a size, and a material) of a workpiece to be held without causing mistakes or the like, with a relatively simple and low-cost configuration and while increase in weight of the feed bar is suppressed.

First Embodiment

Here, in a first embodiment of the present invention, a workpiece conveying tool (workpiece holding tool or workpiece holding apparatus) for a transfer press machine itself does not have a drive ability, and as described below, includes a grip portion, a ball joint portion, an X-axis direction (feed direction) linear-motion mechanism (linear guide), a Y-axis direction (clamp direction) linear-motion mechanism (linear guide), and a Z-axis direction (lift direction) linear-motion mechanism (linear guide). All of those components are driven mechanisms.

Figure 1:
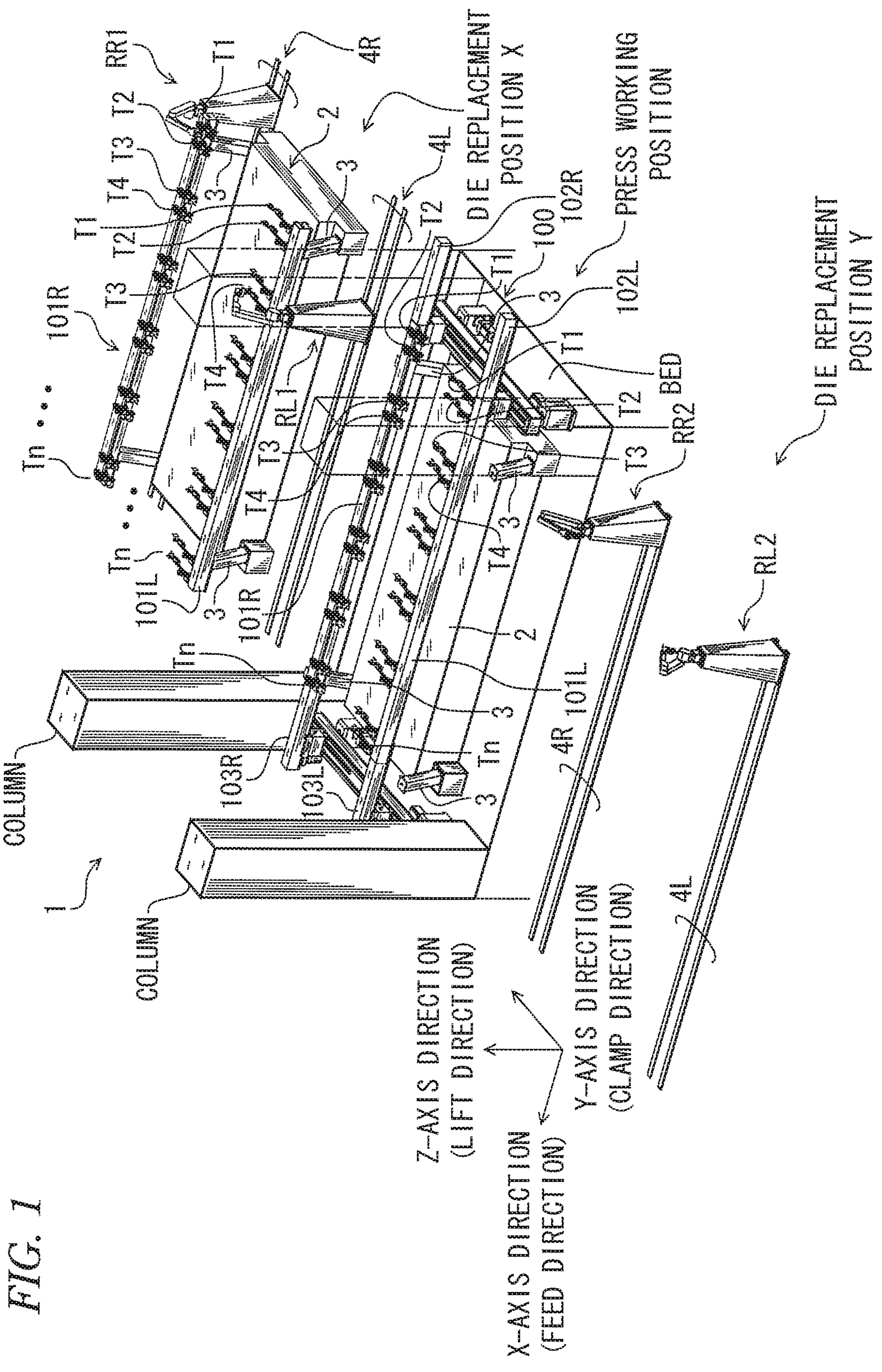
FIG. 1 is a perspective view for illustrating an overall configuration of a transfer press machine in one embodiment (first embodiment) of the present invention.

A workpiece conveying apparatus (transfer) 100 in the first embodiment includes, as illustrated in FIG. 1, feed bars 101R and 101L provided on both sides of a bolster 2 of a transfer press machine 1. The feed bars 101R and 101L are arranged opposed to each other so as to be substantially parallel to a workpiece conveying direction (feed direction).

Figure 2:
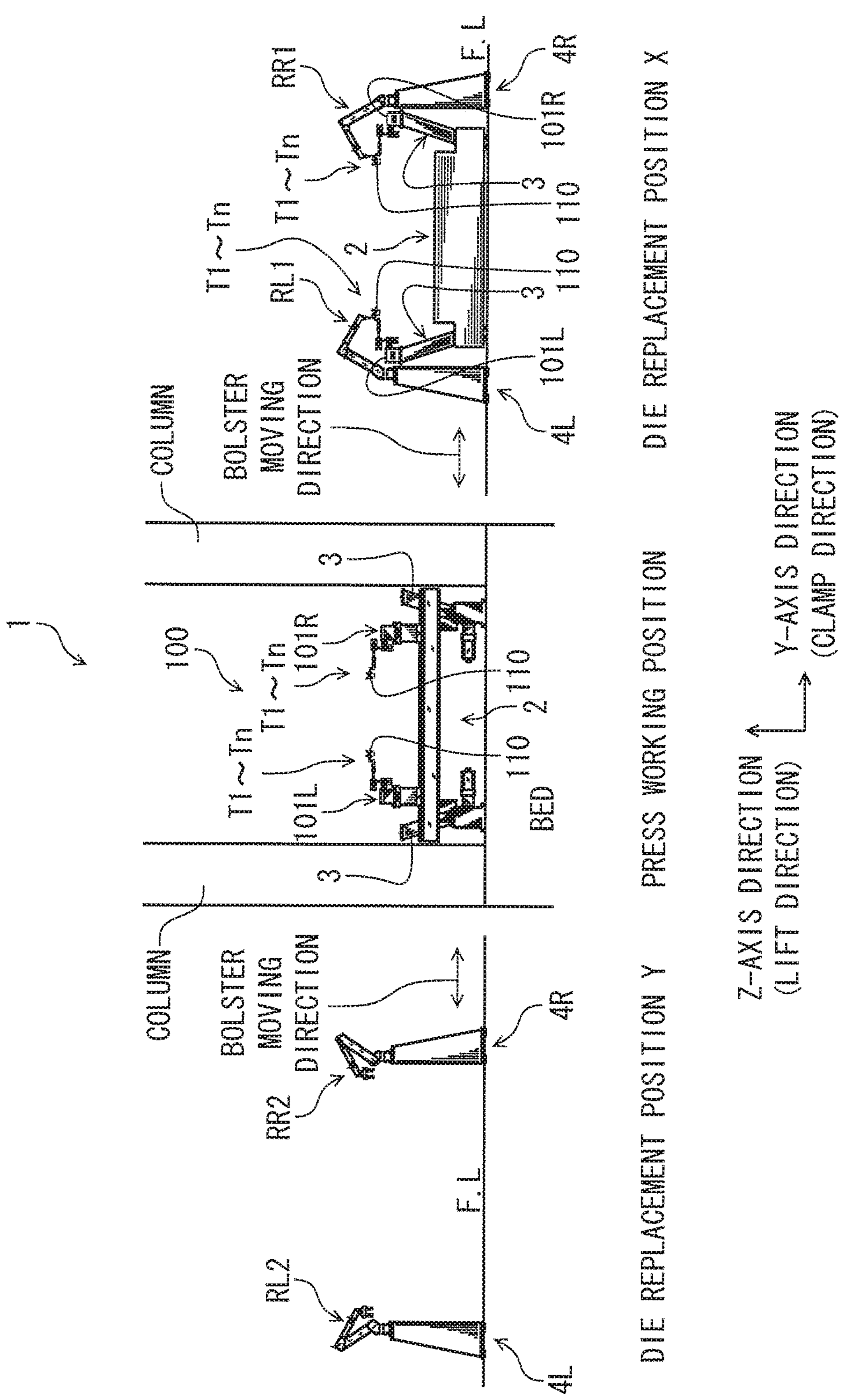
FIG. 2 is a front view for illustrating the transfer press machine of FIG. 1 (view as seen in a direction along a workpiece conveying direction).

Each of the feed bars 101R and 101L includes, as illustrated in FIG. 1, FIG. 2, and other figures, a plurality of holding tools T1 to Tn configured to hold a workpiece at predetermined intervals along a feed (workpiece conveying) direction (long-axis direction of the feed bars 101R and 101L). In this case, each of the holding tools T1 to Tn corresponds to an example of a workpiece holding tool (workpiece holding apparatus) in the present invention.

Each of the holding tools T1 to Tn includes a finger 110 whose position and posture are adjusted so as to enable holding (supporting, placing, or the like) of a workpiece in accordance with the specifications (such as the size, the shape, and the material) of the workpiece to be conveyed (not shown) (see FIG. 2, FIG. 3, FIG. 4, FIG. 8, and other figures).

In this case, in the first embodiment, the relative positions of the holding tools T1 to Tn with respect to the feed bar 101R (101L) and the relative position and the posture of the finger 110 can be changed in accordance with the size, the shape, or the like of the workpiece to be conveyed.

In the first embodiment, the relative positions and the postures are changed with a configuration in which the holding tools T1 to Tn or the feed bar 101R (101L) does not include a drive source for changing the relative positions and the postures.

Therefore, in a workpiece holding tool changing system according to the first embodiment, the positions and the postures of the holding tools T1 to Tn (fingers 110) with respect to the feed bars 101R and 101L are changed in accordance with the size, the shape, or the like of the workpiece by the following method (steps).

<Process of Changing Conveying Tool for Transfer Press Machine Itself>

(Step 1) In the first embodiment, a moving bolster (MB) is adopted as the bolster 2. Together with the moving bolster (MB) 2, the feed bar 101R (101L) and the holding tools T1 to Tn supported by receiving stands 3 are moved from the inside of the transfer press machine 1 to a die replacement position X (or Y) of the moving bolster (MB) 2 outside of a press line (see FIG. 1 and FIG. 2). In FIG. 1 and FIG. 2, illustration is given of a state in which the bolster 2 has already been moved to the die replacement position X. Further, the feed bar 101R (101L) is brought into a state of being separated from feed bar support portions 102R (102L) and 103R (103L) (see FIG. 1) and placed on the receiving stands 3. The feed bar support portions 102R (102L) and 103R (103L) are coupled to a workpiece conveying drive mechanism of the workpiece conveying apparatus (transfer) 100, and are configured to support (clamp), in a separable manner, the feed bar 101R (101L) from both sides in the long-axis direction thereof.

In this case, the moving bolster (MB) refers to the bolster 2 configured to be separable from a bed of the transfer press machine 1, and configured to move from a bed position (press working position) in the transfer press machine 1 to the die replacement position X (die replacement position Y when the die replacement position Y is vacant) outside of the transfer press machine 1 by a drive mechanism included in the separated bolster 2 itself.

At the die replacement position X, workpiece holding tool changing robots (including running carriages) RR1 and RL1 stand by (same state as the state at the die replacement position Y in FIG. 1). The workpiece holding tool changing robots (including running carriages) RR1 and RL1 are movable along robot running rails 4R and 4L extending along the long-axis direction of the feed bars 101R and 101L. At the die replacement position Y, similar workpiece holding tool changing robots (including running carriages) RR2 and RL2 are stand by (see FIG. 1 and FIG. 2).

In this case, each of the workpiece holding tool changing robots RR1 and RL1 and the workpiece holding tool changing robots RR2 and RL2 corresponds to an example of a workpiece holding tool changing apparatus in the present invention.

The die replacement position X (Y) is used as a place for replacement of a plurality of dies (lower dies, not shown), which are mounted along the long-axis direction of the feed bar 101R (101L) on the bolster 2 moved to the die replacement position X (Y), with another dies to be used in the next press working. In the first embodiment, in the manner to be described later, at the die replacement position X (Y), in addition to the replacement of the dies, the positions and the postures of the holding tools T1 to Tn with respect to the feed bars 101R and 101L are changed in accordance with the size, the shape, and the like of the workpiece to be held.

Figure 3:
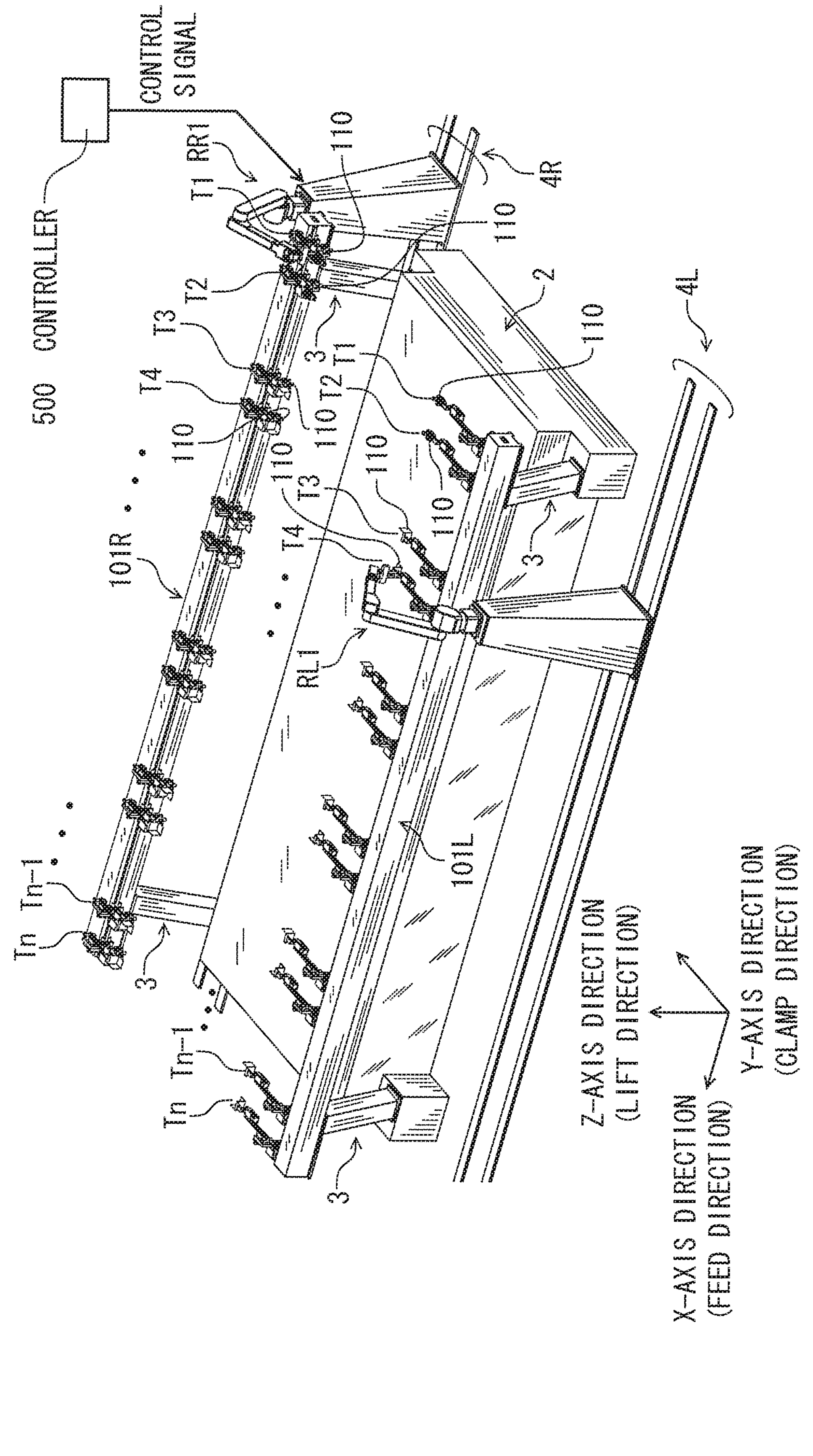
FIG. 3 is an explanatory overall perspective view for illustrating processing of changing a relative position and a posture of a workpiece holding tool on a feed bar by a workpiece holding tool changing robot in the first embodiment (Step 2).

(Step 2) Subsequently in Step 2, the workpiece holding tool changing robot RR1 is moved along the robot running rail 4R to move to the upper side of the holding tool T1 (see FIG. 3 and FIG. 4).

The workpiece holding tool changing robot RR1 is an articulated arm-type robot whose operation is to be controlled by a controller (control device) 500, and can be controlled to be movable along the robot running rail 4R.

Figure 5:
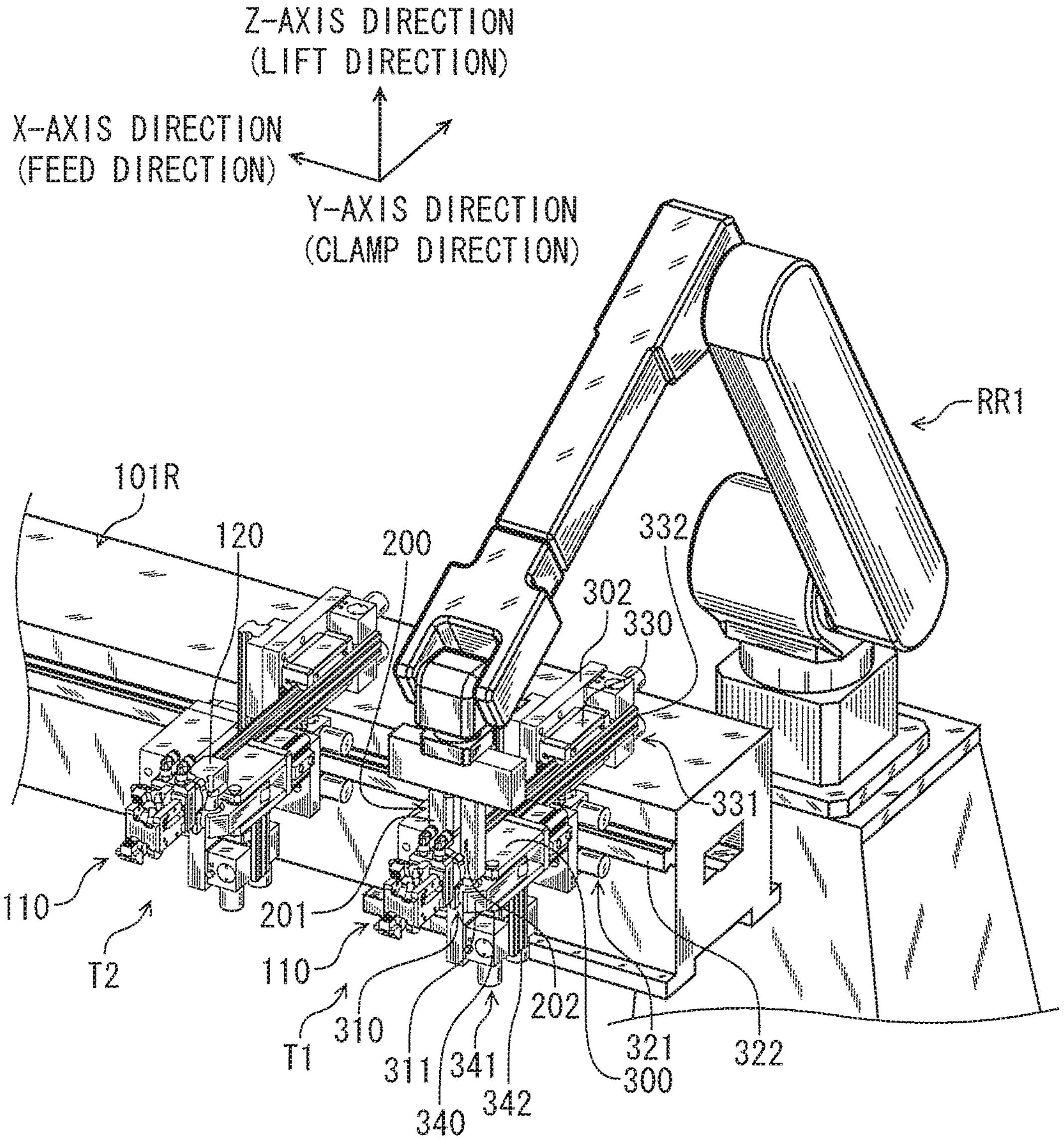
FIG. 5 is an explanatory enlarged perspective view for illustrating the processing of changing the relative position and the posture of the workpiece holding tool on the feed bar by the workpiece holding tool changing robot in the first embodiment (corresponding to Step 3).

(Step 3) Substantially in Step 3, a grip portion 120 of the holding tool T1 is held (clamped) by a first gripper 201 and a second gripper 202 of a gripper 200 provided to the workpiece holding tool changing robot RR1 (see FIG. 5). The grip portion 120 corresponds to an example of a single engaging portion in the present invention. An engaging method is not particularly limited as long as the single engaging portion is used.

(Step 4) Subsequently in Step 4, as illustrated in a pneumatic system diagram of FIG. 11, air pressure (pressurized air) is supplied to an air supply path of a lock system (air pressure in a cylinder is increased) so that actuation of the lock system (ball brake 311, X-axis linear brake 321, Y-axis linear brake 331, and Z-axis linear brake 341) in the holding tool T1 is canceled (friction element of each brake is pressed and returned against an elastic urging force of a spring to release the brake). That is, Step 4 corresponds to a step of bringing the workpiece holding tool changing system into "a state in which inhibition of one of the movement and the change in posture by one of corresponding one movement inhibition mechanism and the posture change inhibition mechanism is canceled" in the present invention.

In the first embodiment, as illustrated in FIG. 4, FIG. 5, FIG. 8, FIG. 9A, FIG. 9B, and other figures, there is provided a ball brake 311 configured to fix and release a ball joint portion 310 configured to freely change the posture of the grip portion 120 of the holding tool T1 and eventually the posture of the finger 110 with respect to the feed bar 101R (distal-end movable base 300 of the holding tool T1). The fixing of the ball brake 311 (brake state) is canceled in this step. Details of the ball brake 311 are described later.

In this case, the ball joint portion 310 and the ball brake 311 correspond to an example of a posture changing mechanism and an example of a posture change inhibition mechanism configured to inhibit the change in posture in the present invention, respectively.

Figure 4:
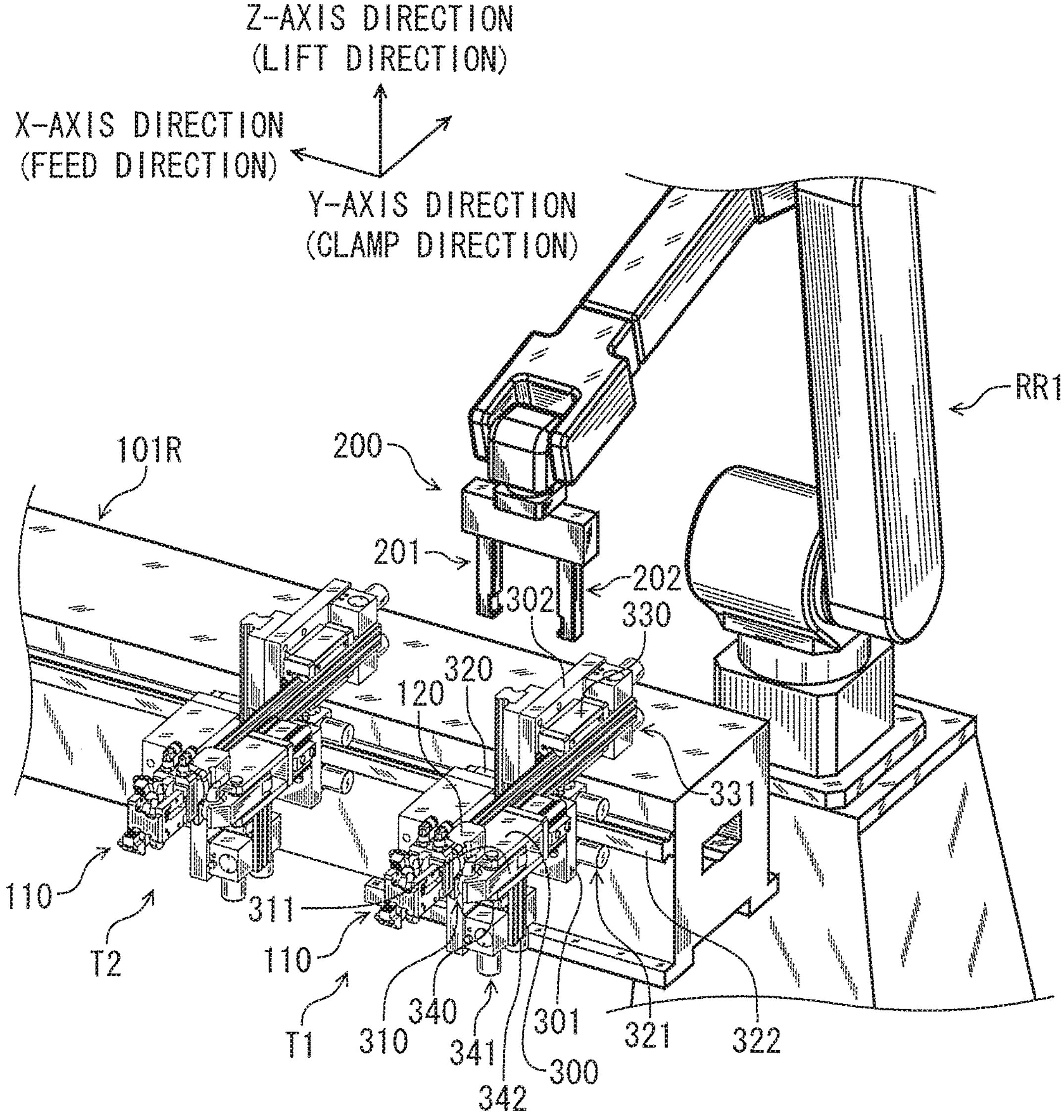
FIG. 4 is an explanatory enlarged perspective view for illustrating the processing of changing the relative position and the posture of the workpiece holding tool on the feed bar by the workpiece holding tool changing robot in the first embodiment (corresponding to Step 2).
Figure 8:
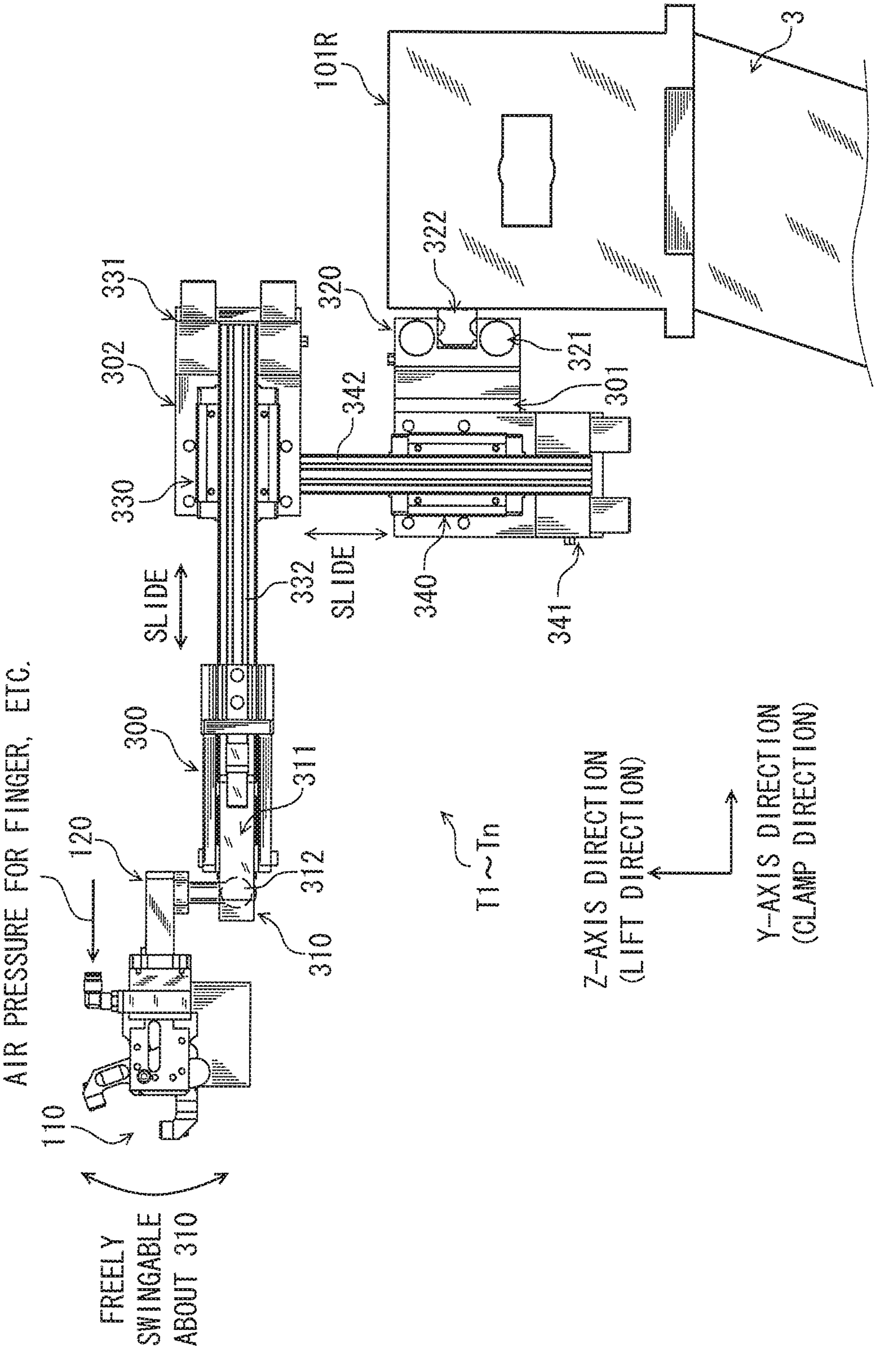
FIG. 8 is a front view for illustrating the workpiece holding tool and the feed bar in the first embodiment (view as seen in a direction along a feed direction).

Further, in the first embodiment, as illustrated in FIG. 4, FIG. 8, and other figures, there is provided an X-axis direction linear mechanism (linear-motion mechanism) 320 that is a linear guide configured to move a proximal-portion movable base 301 and eventually the grip portion 120 and the finger 110 relative to the feed bar 101R along the X-axis direction (feed direction, workpiece conveying direction, or long-axis direction of the feed bar 101R) (X-axis direction guide rail 322). There is further provided an X-axis linear brake 321 configured to enable switching between a movement allowing state and a brake state (movement prohibiting state) of the proximal-portion movable base 301 in the X-axis direction linear mechanism (linear-motion mechanism) 320.

In this case, the X-axis direction linear mechanism 320 and the X-axis linear brake 321 correspond to an example of an X-axis direction linear-motion mechanism and an example of an X-axis direction movement inhibition mechanism configured to inhibit the movement in the present invention, respectively.

Further, as illustrated in FIG. 4, FIG. 8, and other figures, an intermediate movable base 302 includes a Y-axis direction linear mechanism (linear-motion mechanism) 330 that is a linear guide configured to move the distal-end movable base 300, the grip portion 120, and eventually the finger 110 relative to the proximal-portion movable base 301 and the feed bar 101R along the Y-axis direction (clamp direction, workpiece conveying transverse direction, or horizontal short-axis direction of the feed bar 101R) (Y-axis direction guide rail 332). There is further provided a Y-axis linear brake 331 configured to enable switching between a movement allowing state and a brake state (movement prohibiting state) of the distal-end movable base 300 in the Y-axis direction linear mechanism (linear-motion mechanism) 330.

In this case, the Y-axis direction linear mechanism 330 and the Y-axis linear brake 331 correspond to an example of a Y-axis direction linear-motion mechanism and an example of a Y-axis direction movement inhibition mechanism configured to inhibit the movement in the present invention, respectively.

Further, as illustrated in FIG. 4, FIG. 8, and other figures, the proximal-portion movable base 301 includes a Z-axis direction linear mechanism (linear-motion mechanism) 340 that is a linear guide configured to move the intermediate movable base 302 and eventually the distal-end movable base 300, the grip portion 120, and the finger 110 relative to the proximal-portion movable base 301 and the feed bar 101R along the Z-axis direction (lift direction, direction perpendicular to workpiece conveying direction, or vertical short-axis direction of the feed bar 101R) (Z-axis direction guide rail 342). There is further provided a Z-axis linear brake 341 configured to enable switching between a movement allowing state and a brake state (movement prohibiting state) of the intermediate movable base 302 in the Z-axis direction linear mechanism (linear-motion mechanism) 340.

In this case, the Z-axis direction linear mechanism 340 and the Z-axis linear brake 341 correspond to an example of a Z-axis direction linear-motion mechanism and an example of a Z-axis direction movement inhibition mechanism configured to inhibit the movement in the present invention, respectively.

The X-axis linear brake 321, the Y-axis linear brake 331, and the Z-axis linear brake 341 can each be formed of a mechanism illustrated in FIG. 10 as to be described later.

Figure 6:
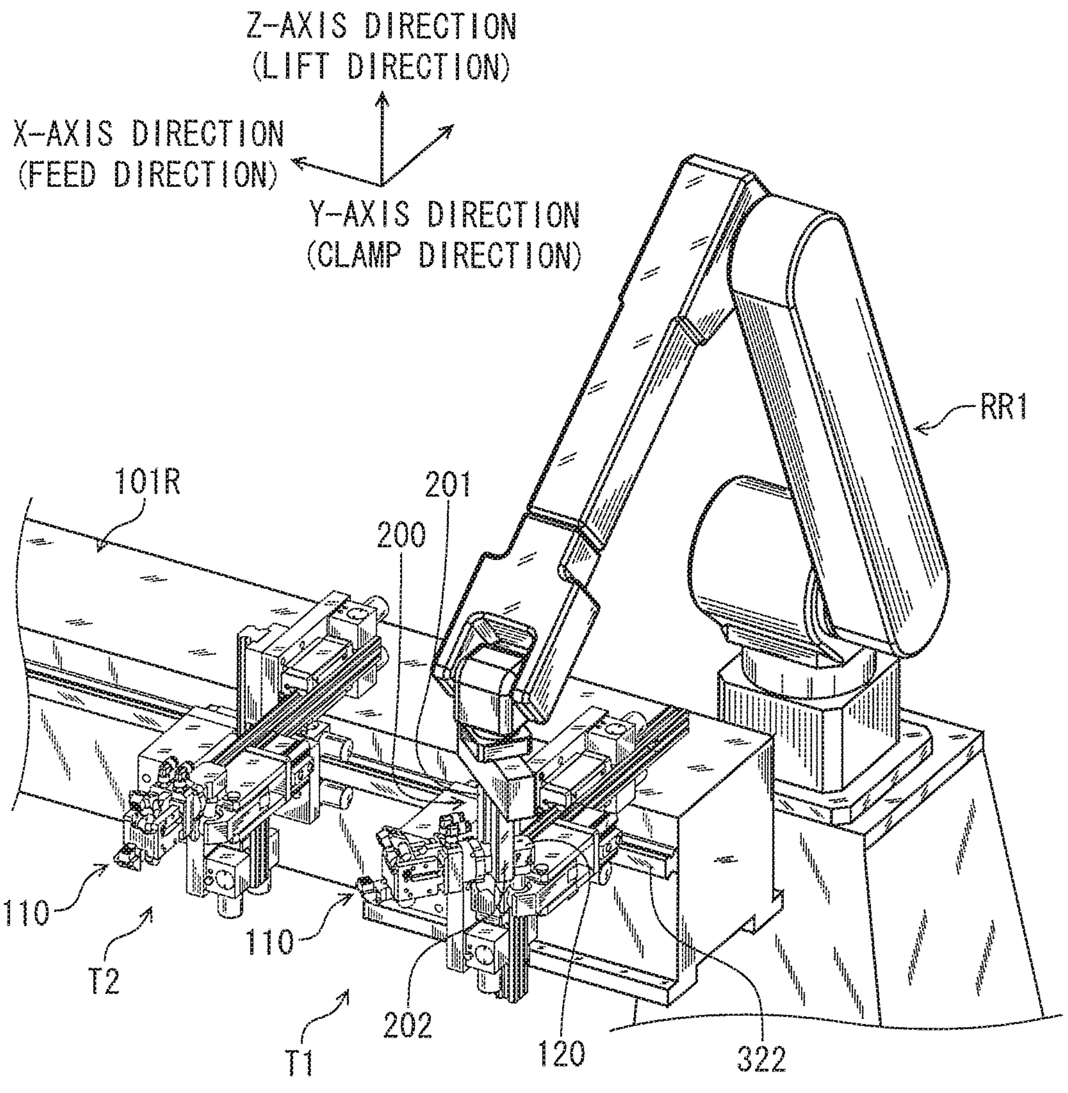
FIG. 6 is an explanatory enlarged perspective view for illustrating the processing of changing the relative position and the posture of the workpiece holding tool on the feed bar by the workpiece holding tool changing robot in the first embodiment (corresponding to Step 5).

(Step 5) Subsequently in Step 5, the workpiece holding tool changing robot RR1 changes the position and the posture of the holding tool T1 by moving the grip portion 120 of the holding tool T1 so that the grip portion 120 achieves a predetermined position and a predetermined posture under control of the controller 500 (see FIG. 6).

That is, along with the operation performed by the workpiece holding tool changing robot RR1 to change the position and the posture of the grip portion 120 of the holding tool T1, the position of the finger 110 is moved and changed via the X-axis direction linear mechanism 320, the Y-axis direction linear mechanism 330, and the Z-axis direction linear mechanism 340, and the posture of the finger 110 is freely changed via the ball joint portion 310.

(Step 6) After the change to a desired position and a desired posture of the holding tool T1 in Step 5, subsequently in Step 6, under a state in which the workpiece holding tool changing robot RR1 holds the grip portion 120 of the holding tool T1, a switching valve switches a path to stop supply of the air pressure to the air supply path of the lock system illustrated in FIG. 11 to decrease the air pressure in the cylinder. In this manner, the lock system (ball brake 311, X-axis linear brake 321, Y-axis linear brake 331, and Z-axis linear brake 341) in the holding tool T1 is actuated (friction element of each brake is pressed by the elastic urging force of the spring to actuate the brake).

In this manner, the holding tool T1 is brought into a state in which the changed position and the changed posture with respect to the feed bar 101R are held. That is, Step 6 corresponds to a step of bringing the workpiece holding tool changing system into "a holding state in which the one of the movement and the change in posture is inhibited by the one of the corresponding one movement inhibition mechanism and the posture change inhibition mechanism" in the present invention.

Figure 7:
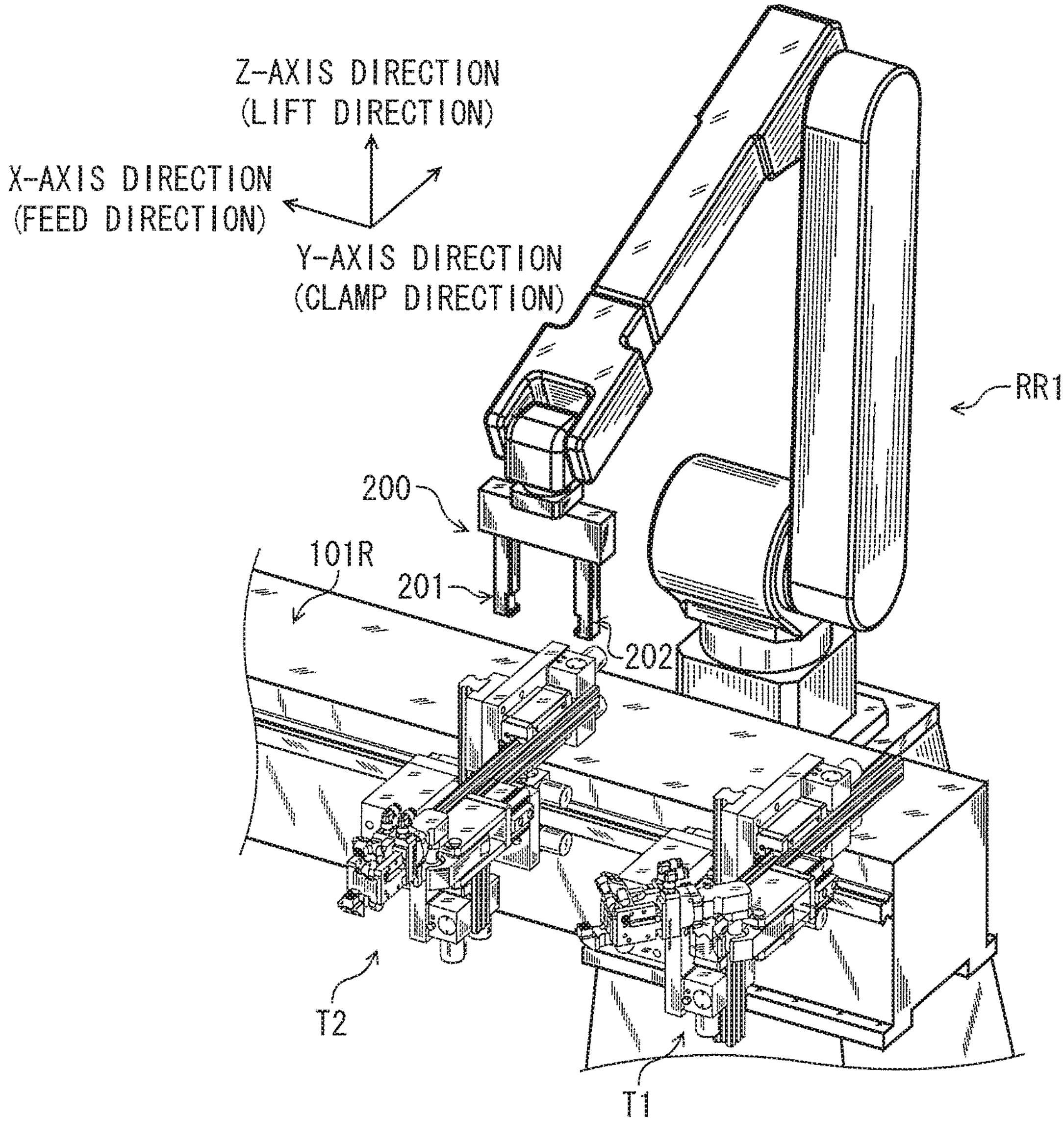
FIG. 7 is an explanatory enlarged perspective view for illustrating the processing of changing the relative position and the posture of the workpiece holding tool on the feed bar by the workpiece holding tool changing robot in the first embodiment (corresponding to Step 7).

(Step 7) After the actuation of the brakes in Step 6, subsequently in Step 7, the workpiece holding tool changing robot RR1 separates from the grip portion 120 of the holding tool T1, and moves on the robot running rail 4R along the extending direction of the feed bar 101R in order to change the position and the posture of the holding tool T2 adjacent to the holding tool T1 (see FIG. 7).

The workpiece holding tool changing robot RR1 performs such processing of Step 1 to Step 7 for the holding tools T1 to Tn supported by the feed bar 101R, and the workpiece holding tool changing robot RL1 is controlled by the controller 500 to perform similar processing for the holding tools T1 to Tn supported by the feed bar 101L.

After the changes in position and posture of the holding tools T1 to Tn supported by the feed bar 101R and the holding tools T1 to Tn supported by the feed bar 101L are completed and the replacement of the dies of the bolster 2 is completed to complete a setup work, a work for replacing the bolster 2 and the feed bars 101R and 101L that are currently used is waited for.

According to the workpiece holding tool changing system for a workpiece conveying apparatus according to the first embodiment as described above, the holding tools T1 to Tn themselves do not include drive ability mechanisms including a drive source. The workpiece holding tool changing robot RR1 (RL1) configured to change the positions and the postures of the plurality of holding tools T1 to Tn sequentially changes the positions and the postures of the individual holding tools T1 to Tn while moving along the extending direction of the feed bar 101R (101L). Therefore, the tool replacement time can be greatly reduced while the increase in weight of the feed bar 101R (101L) is suppressed. Further, mistakes in adjustment of the position and the posture, which may occur in a case of a manual work by an operator, can be eliminated, which can contribute to enhancement in production efficiency.

Further, according to the first embodiment, the necessity of gathering tools in accordance with the specifications (such as the shape, the size, and the material) of the workpiece to be held is greatly reduced, and hence the space can be saved.

That is, according to the first embodiment, it is possible to provide the workpiece holding tool changing system for a workpiece conveying apparatus of a transfer press machine, which is capable of rapidly and accurately changing the position and the posture of the workpiece holding tool (workpiece holding apparatus) with respect to the feed bar in accordance with the specifications (such as the shape, the size, and the material) of the workpiece to be held without causing mistakes or the like with a relatively simple and low-cost configuration and while increase in weight of the feed bar is suppressed.

Now, a configuration example of the ball brake 311 configured to fix and release the ball joint portion 310 in the first embodiment is described with reference to FIG. 9A and FIG. 9B.

Figure 9A:
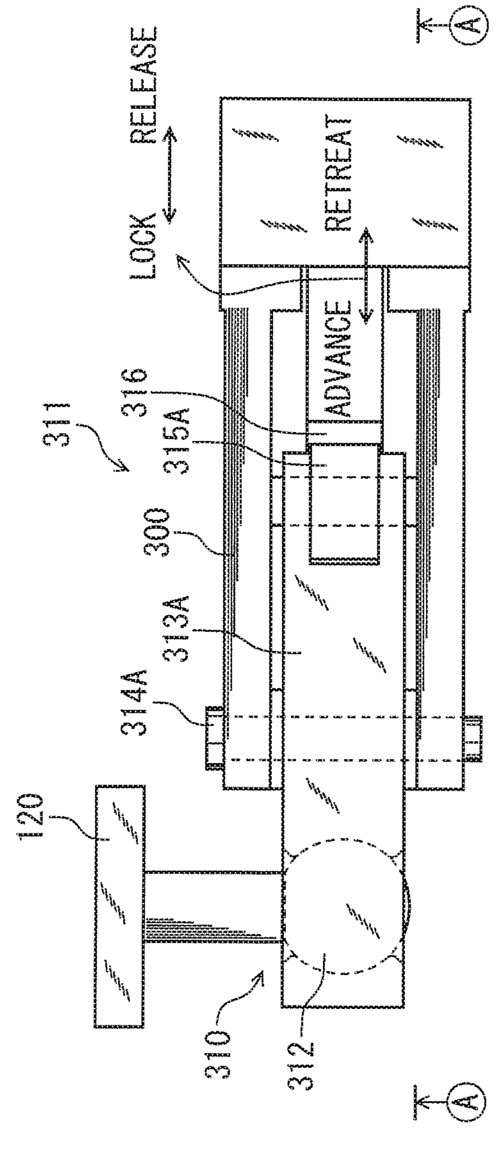
FIG. 9A is a front view for illustrating one configuration example of a ball joint portion and a ball brake of the workpiece holding tool in the first embodiment (view as seen in the direction along the feed direction).
Figure 9B:
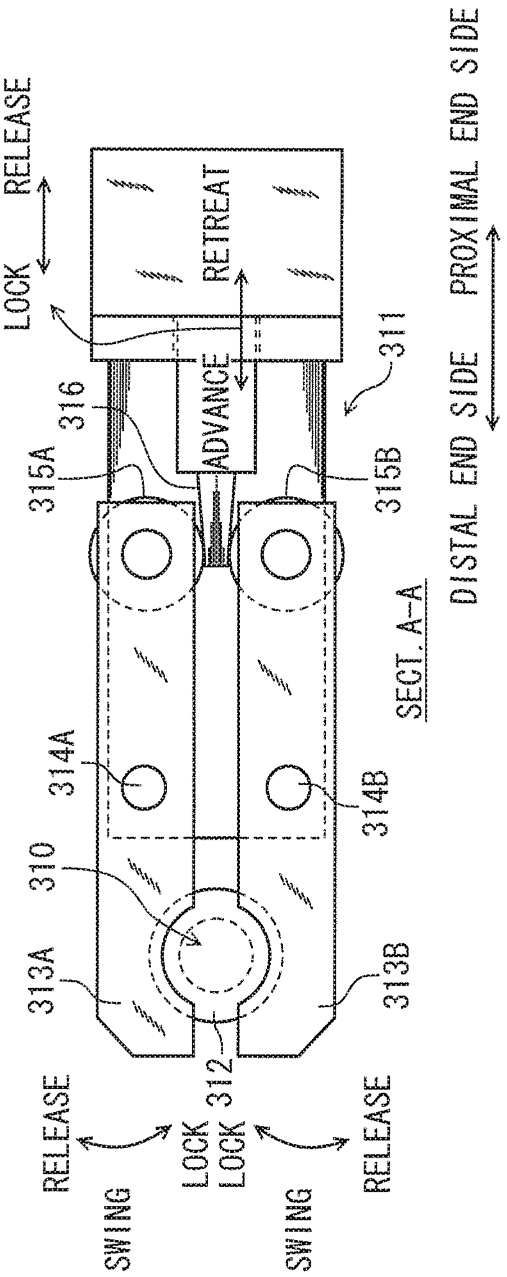
FIG. 9B is a sectional view taken along the line A-A of FIG. 9A.

As illustrated in FIG. 9A and FIG. 9B, the ball joint portion 310 is a universal joint including a spherical portion 312 configured to couple the distal-end movable base 300 to the grip portion 120 of the holding tool T1 and eventually the finger 110 at a free angle (posture). The ball brake 311 is provided so as to enable fixing of the universal joint at a desired position.

The ball brake 311 includes brake movable elements 313A and 313B arranged on both sides of the spherical portion 312 so as to sandwich the spherical portion 312, and the brake movable elements 313A and 313B are supported by the distal-end movable base 300 so as to be freely swingable about swing fulcrums 314A and 314B.

In the brake movable elements 313A and 313B, cam followers 315A and 315B are freely rotatably mounted on a proximal end portion side on an opposite side of the spherical portion 312 on a distal end portion side across the swing fulcrums 314A and 314B.

Further, between the opposed cam followers 315A and 315B, a wedge element 316 is arranged so as to be freely advanceable and retreatable. The air supply path of the lock system illustrated in FIG. 11 is connected to a back surface of the wedge element 316. Under a state in which an air pressure is not supplied (stopped), the wedge element 316 elastically urged by a spring or the like is advanced (moved) toward the distal end side to act so as to separate the cam followers 315A and 315B away from each other. In this manner, the brake movable elements 313A and 313B are swung about the swing fulcrums 314A and 314B so that distal end sides thereof approach each other to sandwich the spherical portion 312. Thus, the grip portion 120 of the holding tool T1 and eventually the finger 110 can be fixed with respect to the distal-end movable base 300.

Meanwhile, under a state in which the air pressure is supplied, the wedge element 316 is retreated toward the proximal end side against the elastic urging force by the spring or the like to allow the cam followers 315A and 315B to approach each other. In this manner, the brake movable elements 313A and 313B are swung about the swing fulcrums 314A and 314B so that the distal end sides thereof are separated away from each other to release the spherical portion 312. Thus, the grip portion 120 of the holding tool T1 and eventually the finger 110 can be freely displaced with respect to the distal-end movable base 300, that is, the posture can be freely changed.

Now, configuration examples of the X-axis linear brake 321, the Y-axis linear brake 331, and the Z-axis linear brake 341 in the first embodiment are described with reference to FIG. 10.

The X-axis linear brake 321 is described as a representative. As illustrated in FIG. 10, the X-axis linear brake 321 is mounted substantially integrally with the corresponding proximal-portion movable base 301, and is configured to hold and release the X-axis direction guide rail (linear guide rail) 322 of the X-axis direction linear mechanism 320, to thereby enable holding (fixing) and releasing of the corresponding proximal-portion movable base 301 and eventually the holding tool T1 at a predetermined position with respect to a longitudinal direction (X-axis direction or feed direction) of the X-axis direction guide rail 322.

Figure 10:
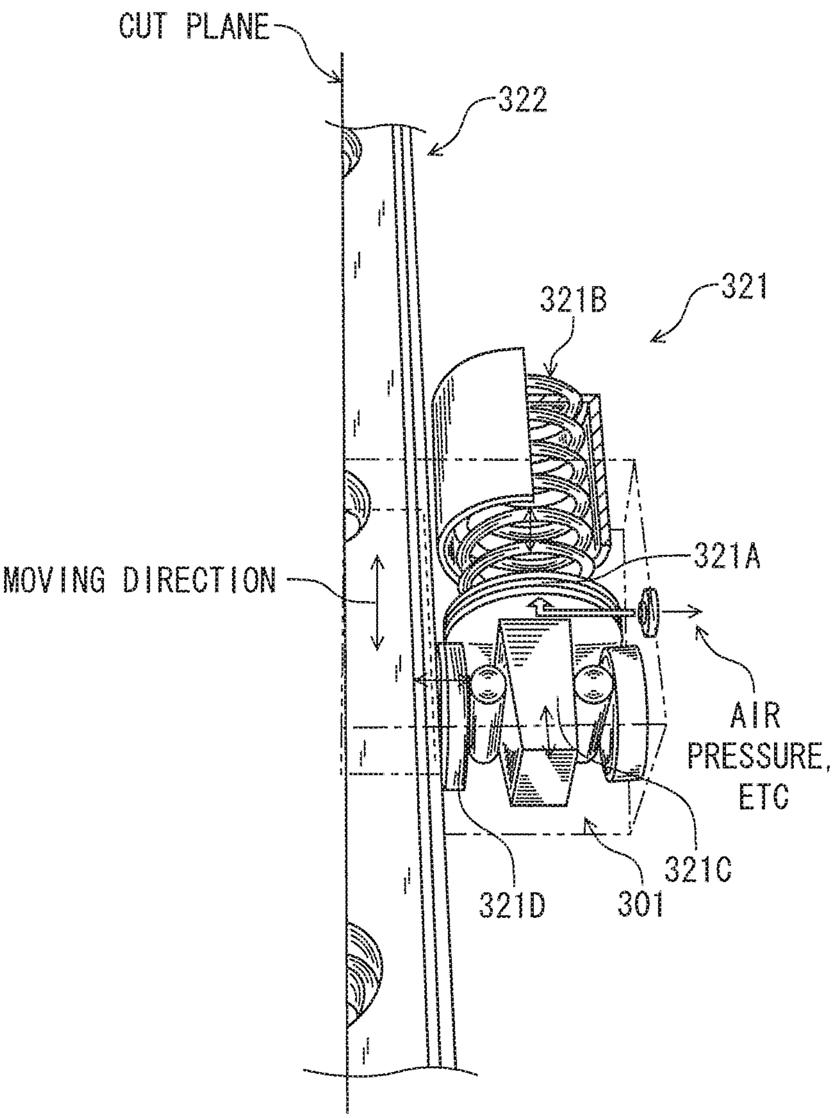
FIG. 10 is a perspective view for illustrating a configuration example of an X-axis linear brake of the workpiece holding tool in the first embodiment.

In FIG. 10, only one side across the cut plane (see FIG. 10) of the X-axis direction guide rail 322 is illustrated.

As the X-axis linear brake 321, for example, a linear clamp manufactured by Nabeya Bi-tech Kaisha (NBK) (product name "Linear Clamper-Zee" (trademark)) can be used.

The X-axis linear brake 321 is configured to directly clamp the X-axis direction guide rail 322 so as to enable holding and positioning of the proximal-portion movable base 301 and eventually the holding tool T1 with respect to the X-axis direction guide rail 322.

For example, as illustrated in FIG. 10, in the X-axis linear brake 321, the proximal-portion movable base 301 engaged so as to be freely slidable in the longitudinal direction of the X-axis direction guide rail 322 includes a piston 321A that is elastically urged downward in FIG. 10 by a spring 321B, and a wedge element 321C whose lower side in FIG. 10 is narrowed is mounted on a back surface (lower side in FIG. 10) of the piston 321A.

On the left side in FIG. 10 of the wedge element 321C, a friction element 321D is provided so as to face the X-axis direction guide rail 322, and the friction element 321D approaches and separates away from the X-axis direction guide rail 322 in accordance with the vertical movement of the wedge element 321C.

That is, under a state in which the air pressure or the like does not act on the back surface of the piston 321A, the piston 321A is pressed by the spring 321B to be brought into a state of being elastically urged downward in FIG. 10. At this time, the wedge element 321C below the piston 321A is also moved downward in FIG. 10 in association with the piston 321A, and hence the friction element 321D is pressed and brought into abutment to the X-axis direction guide rail 322 side by a thick part of the wedge element 321C on the proximal end side (upper side in FIG. 10). As a result, a frictional force is generated between the friction element 321D and the X-axis direction guide rail 322, and thus the proximal-portion movable base 301 and eventually the holding tool T1 are held (fixed) to the X-axis direction guide rail 322.

Meanwhile, when the air pressure or the like acts on the back surface of the piston 321A, the piston 321A is moved upward in FIG. 10 against the elastic urging force of the spring 321B. At this time, the wedge element 321C below the piston 321A is also moved upward in FIG. 10 in association with the piston 321A, and hence a narrow part of the wedge element 321C on the distal end side (lower side in FIG. 10) is engaged with the friction element 321D. Therefore, the pressing force of the friction element 321D with respect to the X-axis direction guide rail 322 is lost, and hence the frictional force between the friction element 321D and the X-axis direction guide rail 322 is lost. As a result, the proximal-portion movable base 301 and eventually the holding tool T1 are brought into a state of being freely slidable (capable of sliding) with respect to the X-axis direction guide rail 322.

The X-axis linear brake 321, the Y-axis linear brake 331, and the Z-axis linear brake 341 in the first embodiment are not limited to the configuration exemplified in FIG. 10, and a different configuration can be employed.

In the first embodiment, as the holding tool changing robots RR1, RL1, RR2, and RL2, articulated arm-type robots as illustrated in FIG. 1 to FIG. 7 and other figures are adopted and described. However, the present invention is not limited to this configuration as long as the positions and the postures of the holding tools T1 to Tn can be adjusted.

Further, in the first embodiment, the holding tool changing robots RR1, RL1, RR2, and RL2 that are articulated arm-type robots are described as the workpiece holding tool changing apparatus in the present invention. However, the workpiece holding tool changing apparatus in the present invention is not limited to those robots that enable movement with relatively high degree of freedom. The workpiece holding tool changing apparatus in the present invention may be a dedicated apparatus configured uniquely as the workpiece holding tool changing apparatus.

Further, the number of fingers 110 included in each of the holding tools T1 to Tn is not limited to 1, and each of the holding tools T1 to Tn may include a plurality of fingers.

Further, in the first embodiment, the bolster 2 is described as a moving bolster (MB). However, the present invention is not limited thereto. The bolster 2 may be a bolster fixed to the transfer press machine. Further, also the feed bar is not limited to the one configured to be freely removable from the workpiece conveying apparatus 100. That is, the present invention is also applicable to a case in which the posture and the position of the workpiece holding tool supported by the feed bar in the transfer press machine are changed. In other words, the present invention is applicable as long as the movable portion, for example, the feed bar, which is movable when the workpiece is conveyed, does not support a drive source for use to change the posture and the position of the workpiece holding tool.

Second Embodiment

Next, another embodiment of the present invention is described.

Similarly to the workpiece holding tool changing system for a workpiece conveying apparatus according to the first embodiment described with reference to FIG. 1 to FIG. 11, also in a workpiece holding tool changing system for a workpiece conveying apparatus according to a second embodiment of the present invention illustrated in FIG. 14, holding tools T1' to Tn' in the second embodiment themselves do not include drive ability mechanisms including a drive source, and the workpiece holding tool changing robot RR1 (RL1) configured to change the positions and the postures of the plurality of holding tools T1' to Tn' sequentially changes the positions and the postures of the individual holding tools T1' to Tn' while moving along the extending direction of the feed bar 101R (101L).

The second embodiment differs from the first embodiment in the holding tools T1' to Tn' arranged on the feed bar 101R (101L). Other configurations and functions are similar to those in the first embodiment, and hence description of those similar elements is omitted. Only the holding tools T1' to Tn' supported by the feed bar 101R (101L) are described in detail.

Also in the second embodiment, similarly to the first embodiment, the workpiece conveying tool (workpiece holding tool or workpiece holding apparatus) for a transfer press machine itself does not have a drive ability. As described below, the workpiece conveying tool includes a grip portion, a ball joint portion, an X-axis direction (feed direction) linear-motion mechanism (linear guide), a first arm (swinging mechanism), and a second arm (swinging mechanism). All of those components are driven mechanisms.

Figure 14:
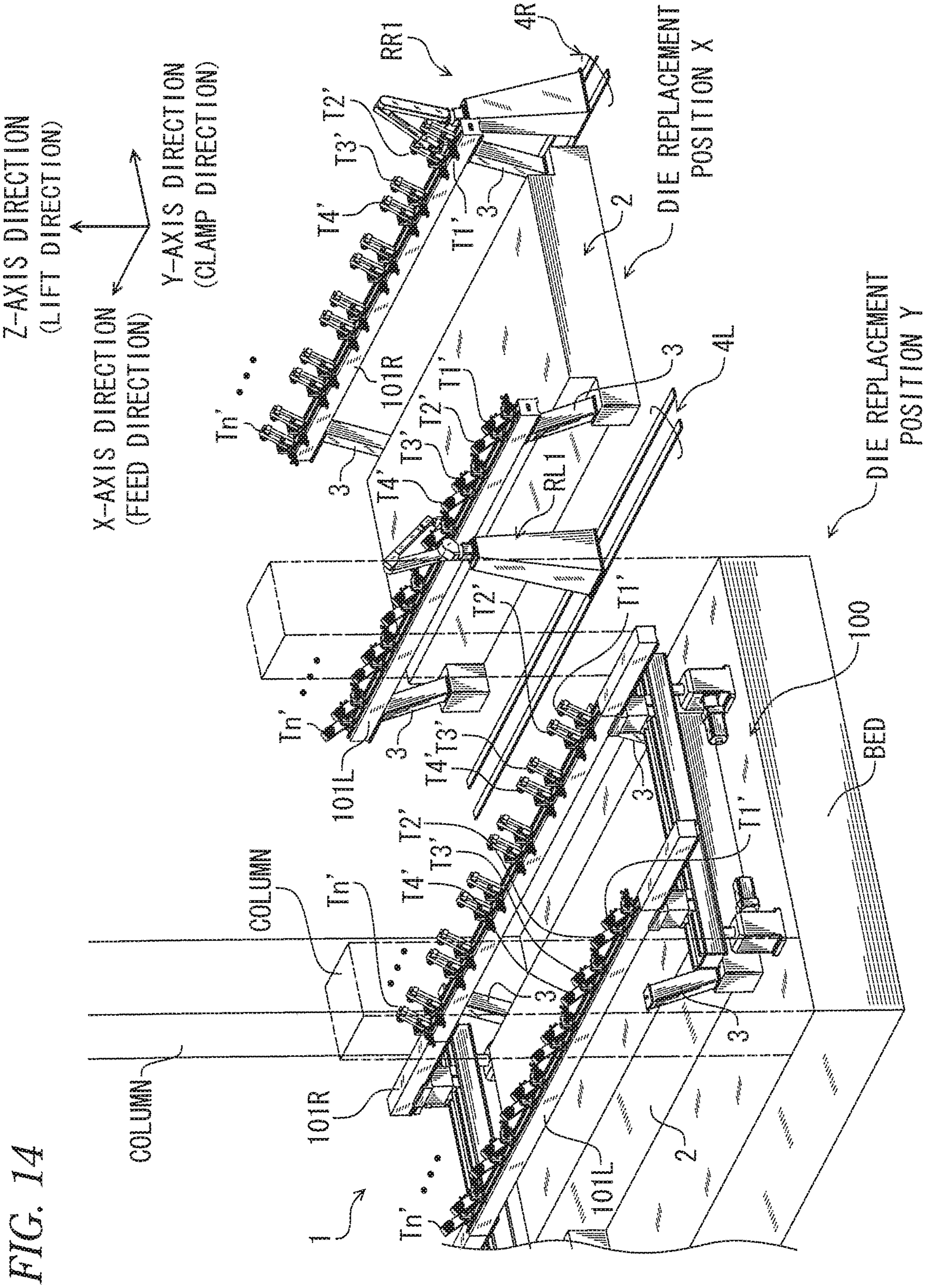
FIG. 14 is a perspective view for illustrating an overall configuration of a transfer press machine in another embodiment (second embodiment) of the present invention.
Figure 15:
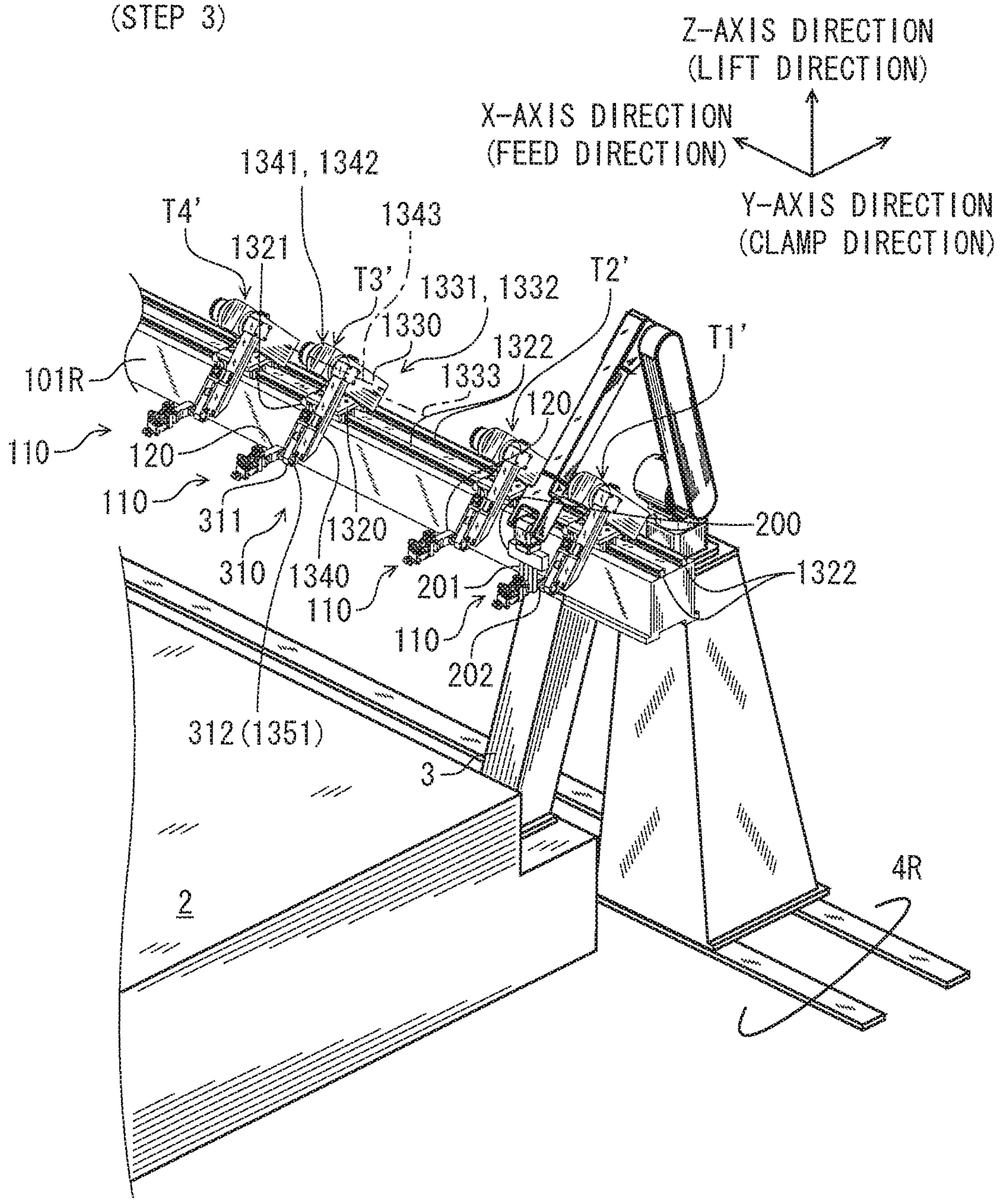
FIG. 15 is an explanatory enlarged perspective view for illustrating processing of changing a relative position and a posture of a workpiece holding tool on a feed bar by a workpiece holding tool changing robot in the second embodiment (corresponding to Step 3).

In the second embodiment, each of the feed bars 101R and 101L includes, as illustrated in FIG. 14, FIG. 15, and other figures, the plurality of holding tools T1' to Tn' configured to hold a workpiece at predetermined intervals along a feed (workpiece conveying) direction (long-axis direction of the feed bars 101R and 101L).

In this case, each of the holding tools T1' to Tn' corresponds to an example of the workpiece holding tool (workpiece holding apparatus) in the present invention.

Each of the holding tools T1' to Tn' includes the finger 110 whose position and posture are adjusted so as to enable holding (supporting, placing, or the like) of a workpiece in accordance with the specifications (such as the size, the shape, and the material) of the workpiece to be conveyed (not shown) (see FIG. 14, FIG. 15, FIG. 16A, FIG. 16B, FIG. 17A to FIG. 17D, and other figures).

In the second embodiment, configurations of the finger, the ball joint portion, and other components are similar to those in the first embodiment. Therefore, the components are denoted by the same reference symbols, and detailed description of those components is omitted.

In the second embodiment, as illustrated in FIG. 14 to FIG. 17D, there is provided an X-axis direction linear mechanism (linear-motion mechanism) 1320 that is a linear guide on an upper surface of each of the feed bars 101R and 101L.

The X-axis direction linear mechanism (linear-motion mechanism) 1320 (X-axis direction guide rail 1322) is provided on the upper surface of each of the feed bars 101R and 101L. On an upper surface of the X-axis direction linear mechanism (linear-motion mechanism) 1320 (X-axis direction guide rail 1322), a proximal-portion movable base 1301 is supported so as to be movable along the longitudinal direction of the X-axis direction linear mechanism (linear-motion mechanism) 1320 (X-axis direction guide rail 1322).

That is, the proximal-portion movable base 1301 is configured to be movable relative to the X-axis direction guide rail 1322 along the X-axis direction (feed direction, workpiece conveying direction, or long-axis direction of the feed bar 101R (101L)). With this configuration, the grip portion 120 and the finger 110 supported by the proximal-portion movable base 1301 can be moved along the X-axis direction.

Further, there is provided an X-axis linear brake 1321 configured to enable switching between a movement allowing state and a brake state (movement prohibiting state) of the proximal-portion movable base 1301 with respect to the X-axis direction linear mechanism (linear-motion mechanism) 1320.

The X-axis direction linear mechanism (linear-motion mechanism) 1320, the X-axis linear brake 1321, and the X-axis direction guide rail 1322 have the same configurations as those of the X-axis direction linear mechanism (linear-motion mechanism) 320, the X-axis linear brake 321, and the X-axis direction guide rail 322 in the first embodiment, respectively, while only the mounting places are different. In the first embodiment, the components are mounted on the side surface of the feed bar 101R (101L). However, in the second embodiment, there is exemplified a case in which the components are mounted on the upper surface of the feed bar 101R (101L). In the second embodiment, the X-axis direction linear mechanism 1320 and the X-axis linear brake 1321 can be mounted on a lower surface (substantially horizontal surface) or the side surface (substantially vertical surface) of the feed bar 101R (101L).

In this case, the X-axis direction linear mechanism 1320 and the X-axis linear brake 1321 correspond to an example of the X-axis direction linear-motion mechanism and an example of the X-axis direction movement inhibition mechanism configured to inhibit the movement in the present invention, respectively.

Figure 16A:
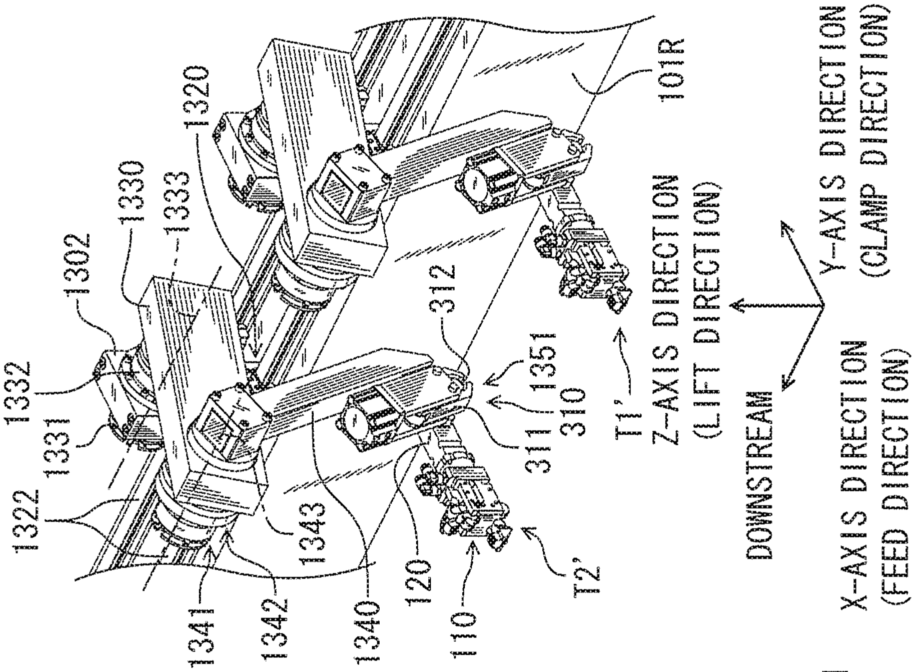
FIG. 16A is a perspective view for illustrating the workpiece holding tool and the feed bar in the second embodiment (perspective view as obliquely seen from above on upstream in the feed direction).
Figure 16B:
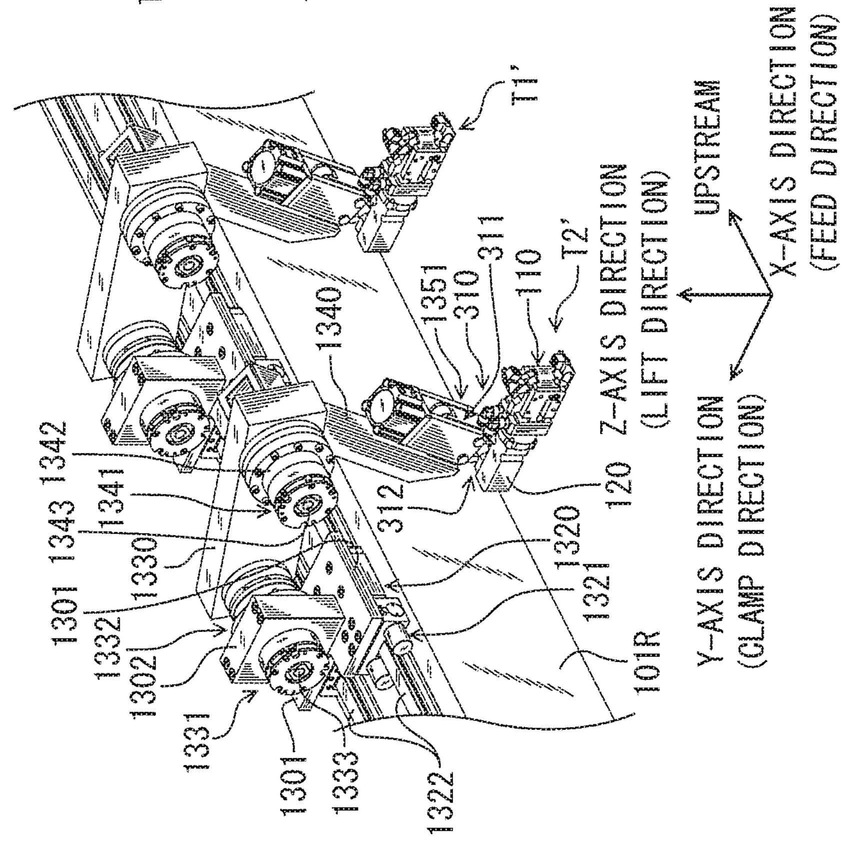
FIG. 16B is a perspective view for illustrating the workpiece holding tool and the feed bar in the second embodiment (perspective view as obliquely seen from above on downstream in the feed direction).
Figure 17B:
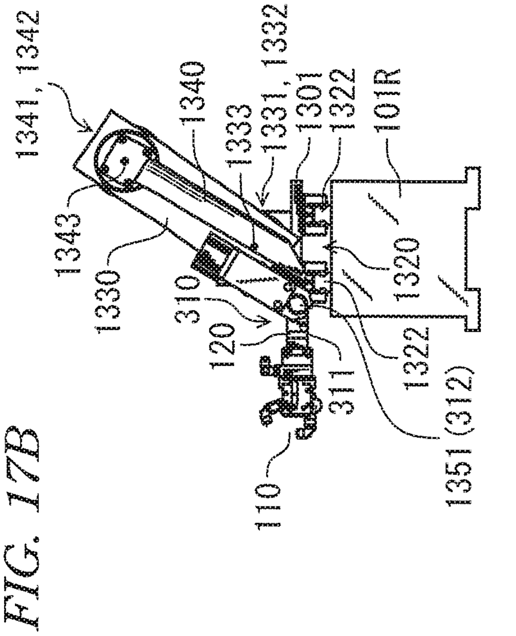
FIG. 17B is a front view for illustrating a case in which the arm is folded from the state of FIG. 17A.
Figure 17D:
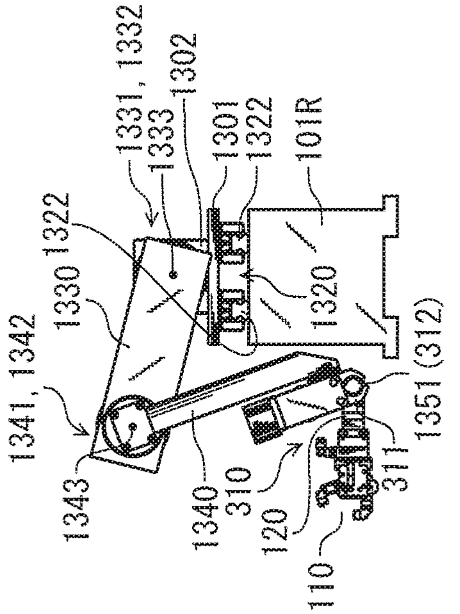
FIG. 17D is a front view for illustrating a case in which the arm is folded from the state of FIG. 17C.
Figure 17A:
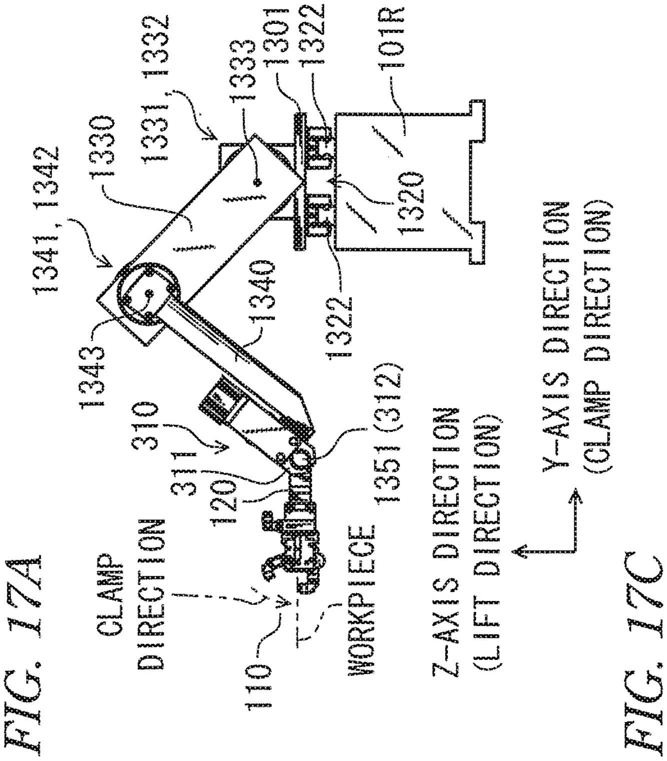
FIG. 17A is a front view for illustrating the workpiece holding tool and the feed bar in the second embodiment (view as seen in the direction along the feed direction) (example of a state in which an arm is extended).
Figure 17C:
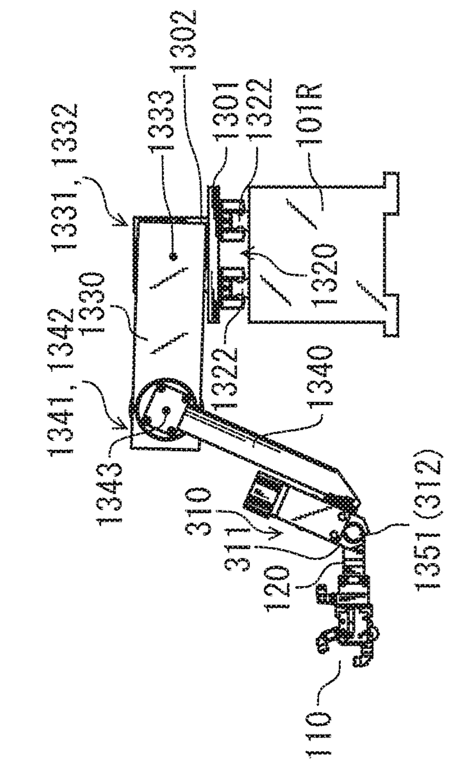
FIG. 17C is a front view for illustrating a state in which a finger is lowered from the state of FIG. 17A (example of a state in which the arm is extended).

Further, in the second embodiment, as illustrated in FIG. 15, FIG. 16A, FIG. 16B, and other figures, a first-arm support base 1302 is mounted on an upper surface of the proximal-portion movable base 1301, and the first-arm support base 1302 supports (pivotally supports) a first arm 1330 so that the first arm 1330 is freely swingable in a substantially vertical plane (in a plane substantially parallel to the Z-axis direction) via (about) a first joint 1333. Moreover, the first-arm support base 1302 may be configured so that the first arm 1330 is freely swingable in a plane inclined by a predetermined amount from the vertical plane.

The first joint 1333 includes a first-arm brake mechanism 1331 and a first-arm speed reduction mechanism 1332 between the first-arm support base 1302 and the first arm 1330, and is configured to enable switching between a state in which the first arm 1330 is freely swingable with respect to the first-arm support base 1302 and a state in which the swinging is inhibited.

As the first-arm brake mechanism 1331, there can be adopted a mechanical brake mechanism configured to apply a brake by pressing a friction element against a rotor by an air pressure or the like, such as a drum brake or a disc brake. Otherwise, under a state in which no air is supplied (at the time of press working), the brake may be actuated by pressing the friction element of the brake by an elastic urging force of a spring or the like, and under a state in which air is supplied (at the time of tool posture changing work), the brake may not be actuated by separating the friction element of the brake away from a target to be braked against the elastic urging force of the spring or the like.

An electromagnetic brake may be alternatively adopted as the first-arm brake mechanism 1331. For example, "BXW" that is a commercially available model manufactured by MIKI PULLEY CO., LTD. can be adopted. In this case, under a state in which no electric power is supplied (at the time of press working), the brake may be actuated by pressing the friction element of the brake by an elastic urging force of a spring or the like, and under a state in which electric power is supplied (at the time of tool posture change), the brake may not be actuated by separating the friction element of the brake away from a target to be braked against the elastic urging force of the spring or the like.

Further, as the first-arm speed reduction mechanism 1332, for example, a speed reduction mechanism of a harmonic drive (trademark) type such as "CSF-25-160-2UH" that is a model manufactured by Harmonic Drive Systems Inc. can be used. However, the present invention is not limited thereto. A general speed reduction mechanism using a gear mechanism can be adopted.

When the first-arm speed reduction mechanism 1332 is provided between the first arm 1330 and the first-arm support base 1302, for example, a desired brake force (torque) can be generated with a small force (torque) of about 1/120 while the weight is reduced. In a case in which a desired brake force can be generated even when the first-arm speed reduction mechanism 1332 is omitted, the first-arm speed reduction mechanism 1332 can be omitted. The details described for the first-arm speed reduction mechanism 1332 are similarly applicable also to each speed reduction mechanism to be described below.

In this case, the first joint 1333 and the first-arm brake mechanism 1331 correspond to an example of a first joint and an example of a first-arm swinging inhibition mechanism in the present invention, respectively.

Further, in the second embodiment, a distal end of the first arm 1330 supports (pivotally supports) a second arm 1340 so that the second arm 1340 is freely swingable in the substantially vertical plane (in the plane substantially parallel to the Z-axis direction) via (about) a second joint 1343. Moreover, the second arm 1340 may be freely swingable in a plane inclined by a predetermined amount from the vertical plane.

The second joint 1343 includes a second-arm brake mechanism 1341 and a second-arm speed reducer 1342 between the first arm 1330 and the second arm 1340, and is configured to enable switching between a state in which the second arm 1340 is freely swingable with respect to the first arm 1330 and a state in which the swinging is inhibited.

In this case, the second joint 1343 and the second-arm brake mechanism 1341 correspond to an example of a second joint and an example of a second-arm swinging inhibition mechanism in the present invention, respectively.

The second-arm brake mechanism 1341 and the second-arm speed reducer 1342 can adopt configurations similar to those of the first-arm brake mechanism 1331 and the first-arm speed reduction mechanism 1332 described above.

Further, in the second embodiment, a distal end of the second arm 1340 supports the grip portion 120 and eventually the finger 110 via a third joint 1351 at free angles (postures) with respect to the second arm 1340.

The third joint 1351 corresponds to the spherical portion 312 of the ball joint portion 310 that is a universal joint. Similarly to the first embodiment, the ball brake 311 is provided so as to enable fixing of the spherical portion 312 (universal joint part) of the ball joint portion 310 at a desired position (posture position) (see FIG. 9A and FIG. 9B).

In this case, the third joint 1351 (ball joint portion 310) and the ball brake 311 correspond to an example of the posture changing mechanism and an example of the posture change inhibition mechanism configured to inhibit the change in posture in the present invention, respectively.

<Process of Changing Conveying Tool for Transfer Press Machine Itself>

Also in the second embodiment, similarly to the first embodiment, as illustrated in FIG. 14, at the die replacement position X, the workpiece holding tool changing robots (including running carriages) RR1 and RL1 that are movable along the robot running rails 4R and 4L extending along the long-axis direction of the feed bars 101R and 101L change the positions and the postures of the fingers 110 of the holding tools T1' to Tn' in accordance with the size, the shape, and the like of the workpiece to be held.

How to change the positions and the postures of the fingers 110 of the holding tools T1' to Tn' is similar to that in the first embodiment.

Specifically, the grip portion 120 of the holding tool T1' is held (clamped) by the first gripper 201 and the second gripper 202 of the gripper 200 provided to the workpiece holding tool changing robot RR1 as illustrated in FIG. 15 or other figures (corresponding to Step 3 described above). Step 1 and Step 2 are similar to those described in the first embodiment, and hence description thereof is omitted here.

Figure 11:
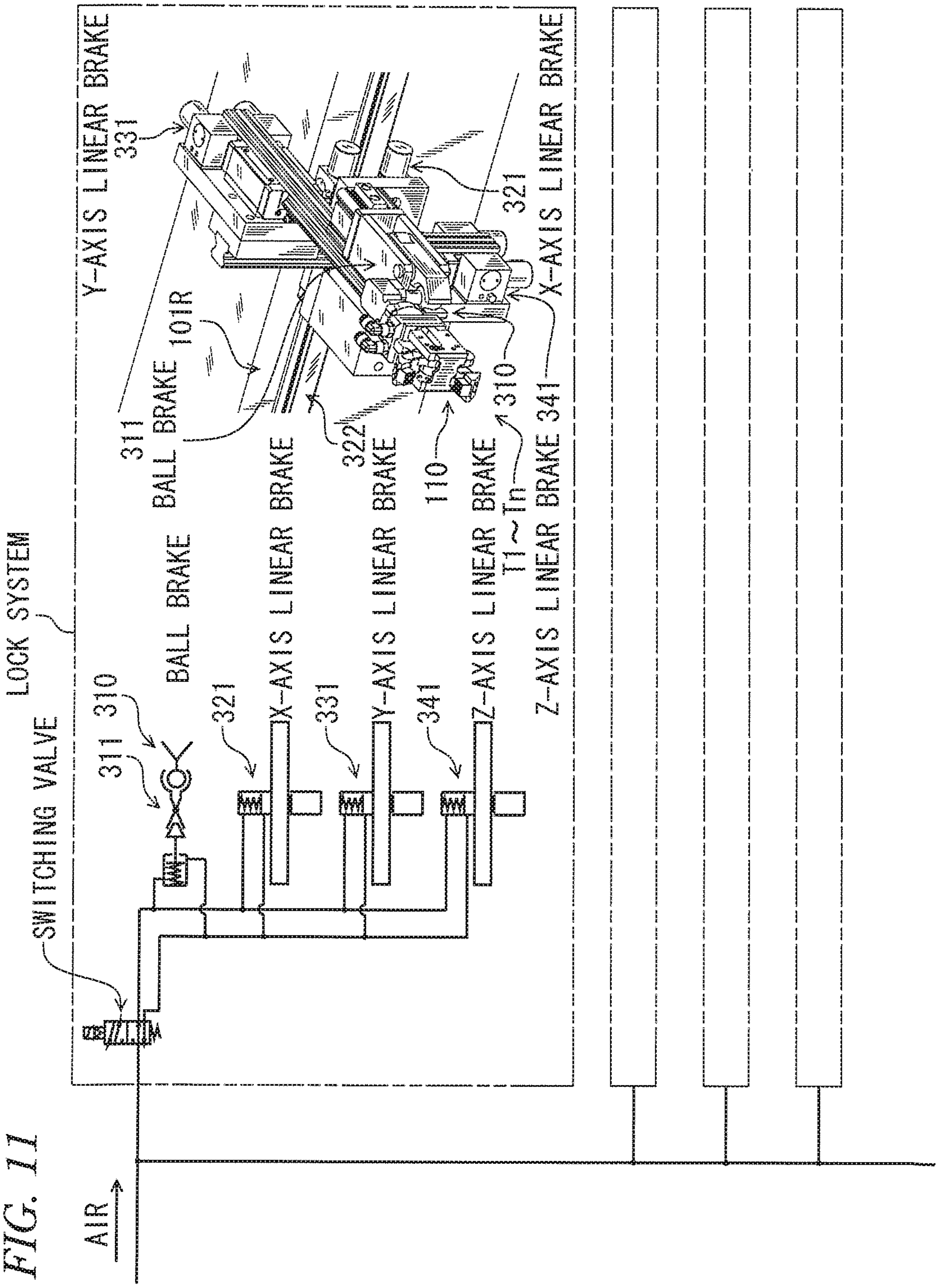
FIG. 11 is a pneumatic system diagram (air supply path diagram) for illustrating an example of a lock system for the workpiece holding tool in the first embodiment.
Figure 12:
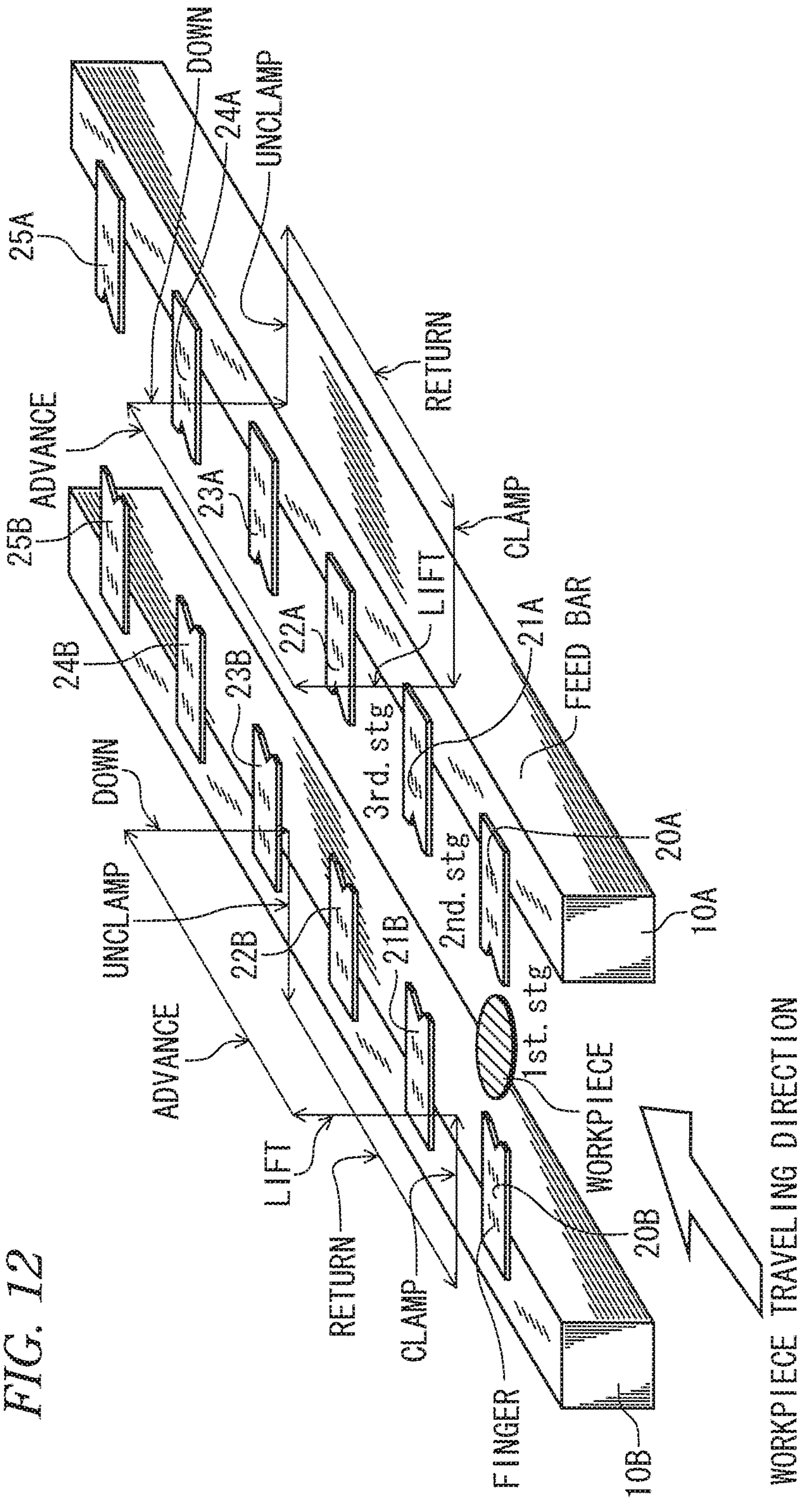
FIG. 12 is a perspective view (explanatory view for illustrating an operation) for illustrating an example of a workpiece conveying apparatus (feed bar type) of a related-art press machine (transfer press machine).
Figure 13:
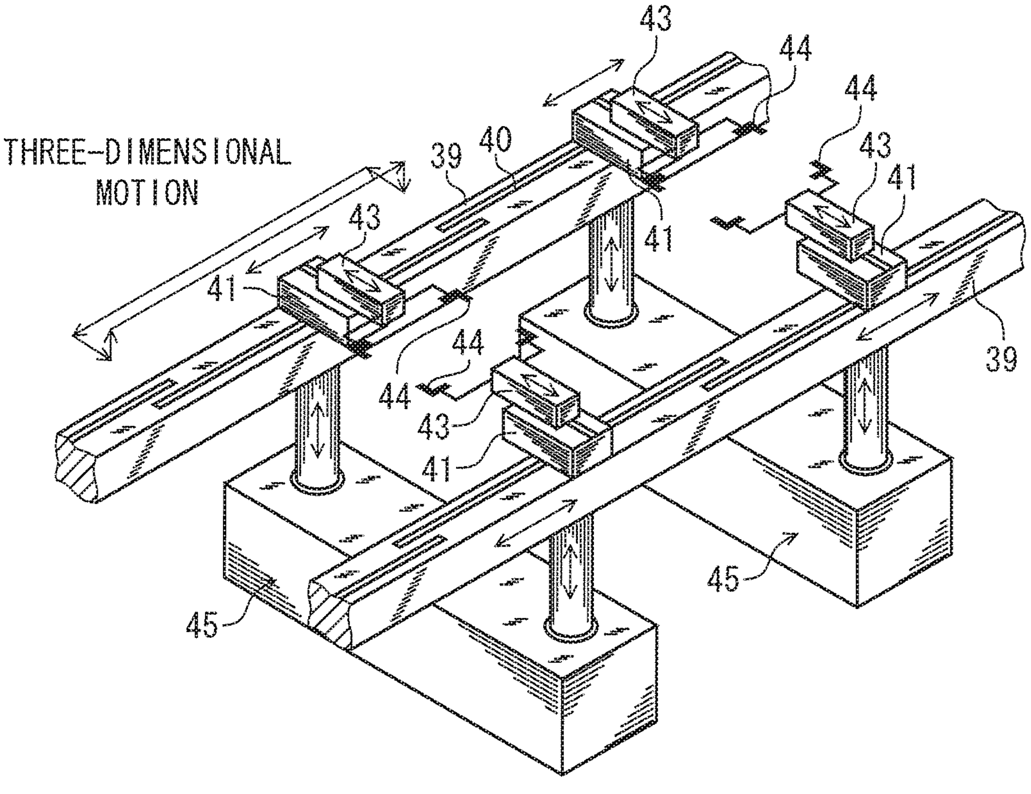
FIG. 13 is a perspective view for illustrating another configuration example of the workpiece conveying apparatus (feed bar type) of the related-art press machine (transfer press machine).

Next (corresponding to Step 4 described above), as illustrated in the pneumatic system diagram of FIG. 11, air pressure (pressurized air) is supplied to the air supply path of the lock system so that actuation of the lock system (ball brake 311, X-axis linear brake 1321, first-arm brake mechanism 1331, and second-arm brake mechanism 1341) in the holding tool T1' is canceled (friction element of each brake is pressed and returned against an elastic urging force of a spring to release the brake).

That is, this step corresponds to a step of bringing the workpiece holding tool changing system into "a state in which inhibition of the movement, the swinging, and the change in posture by the X-axis direction movement inhibition mechanism, the first-arm swinging inhibition mechanism, the second-arm swinging inhibition mechanism, and the posture change inhibition mechanism is canceled" in the present invention.

Subsequently (corresponding to Step 5 described above), the workpiece holding tool changing robot RR1 changes the position and the posture of the holding tool T1' by moving the grip portion 120 of the holding tool T1' so that the grip portion 120 achieves a predetermined position and a predetermined posture under control of the controller 500 (see FIG. 15, FIG. 17A to FIG. 17D, and other figures).

That is, along with the operation performed by the workpiece holding tool changing robot RR1 to change the position and the posture of the grip portion 120 of the holding tool T1', the position (position relative to the feed bar 101R) of the finger 110 is moved and changed via the movement of the X-axis direction linear mechanism 1320, the swinging of the first arm 1330, and the swinging of the second arm 1340, and the posture of the finger 110 is freely changed via the ball joint portion 310.

After that (corresponding to Step 6 described above), under a state in which the workpiece holding tool changing robot RR1 holds the grip portion 120 of the holding tool T1', a switching valve switches a path to stop the supply of the air pressure to the air supply path of the lock system illustrated in FIG. 11 to decrease the air pressure in the cylinder. In this manner, the lock system (ball brake 311, X-axis linear brake 1321, first-arm brake mechanism 1331, and second-arm brake mechanism 1341) in the holding tool T1' is actuated (friction element of each brake is pressed by the elastic urging force of the spring to actuate the brake).

In this manner, the holding tool T1' is brought into a state in which the changed position and the changed posture with respect to the feed bar 101R are held.

That is, this step corresponds to a step of bringing the workpiece holding tool changing system into "a holding state in which the movement, the swinging, and the change in posture are inhibited by the X-axis direction movement inhibition mechanism, the first-arm swinging inhibition mechanism, the second-arm swinging inhibition mechanism, and the posture change inhibition mechanism" in the present invention.

The next step (Step 7 described above) and the subsequent steps are similar to those in the first embodiment, and hence description thereof is omitted here.

The workpiece holding tool changing robot RR1 performs such processing for the holding tools T1' to Tn' supported by the feed bar 101R, and the workpiece holding tool changing robot RL1 is controlled by the controller 500 to perform similar processing for the holding tools T1' to Tn' supported by the feed bar 101L.

According to the workpiece holding tool changing system for a workpiece conveying apparatus according to the second embodiment as described above, the holding tools T1' to Tn' themselves do not include drive ability mechanisms including a drive source. The workpiece holding tool changing robot RR1 (RL1) configured to change the positions and the postures of the plurality of holding tools T1' to Tn' sequentially changes the positions and the postures of the individual holding tools T1' to Tn' while moving along the extending direction of the feed bar 101R (101L). Therefore, the tool replacement time can be greatly reduced while the increase in weight of the feed bar 101R (101L) is suppressed. Further, mistakes in adjustment of the position and the posture, which may occur in a case of a manual work by an operator, can be eliminated, which can contribute to enhancement in production efficiency.

Further, according to the second embodiment, the necessity of gathering tools in accordance with the specifications (such as the shape, the size, and the material) of the workpiece to be held is greatly reduced, and hence the space can be saved.

That is, according to the second embodiment, it is possible to provide the workpiece holding tool changing system for a workpiece conveying apparatus of a transfer press machine, which is capable of rapidly and accurately changing the position and the posture of the workpiece holding tool (workpiece holding apparatus) with respect to the feed bar in accordance with the specifications (such as the shape, the size, and the material) of the workpiece to be held without causing mistakes or the like with a relatively simple and low-cost configuration and while increase in weight of the feed bar is suppressed.

In particular, according to the second embodiment, each of the holding tools T1' to Tn' is placed on the upper surface of the feed bar through intermediation of the first-arm support base 1302, and the first arm 1330 and the second arm 1340 are configured to swing in the substantially vertical plane (in the plane substantially parallel to the Z-axis direction). Therefore, as compared to a case in which the holding tools are mounted on the side surface of the feed bar as in the first embodiment, the possibility that the holding tools T1' to Tn' are brought into contact with the dies is reduced even under a state in which the feed bar is close to the dies. As a result, a space in the clamp direction can be reduced, which can contribute to reduction in installation space of the press line and enhancement of the degree of freedom in installation or the like.

The present invention is not limited thereto, and can adopt a configuration in which the first-arm support base 1302 is mounted on the side surface (substantially vertical surface) or the lower surface (substantially horizontal surface) of the feed bar.

Third Embodiment

Next, another embodiment of the present invention is described.

Similarly to the workpiece holding tool changing system for a workpiece conveying apparatus according to the first embodiment or the second embodiment, holding tools T1" to Tn" in a third embodiment themselves do not include drive ability mechanisms including a drive source, and the workpiece holding tool changing robot RR1 (RL1) configured to change the positions and the postures of the plurality of holding tools T1" to Tn" sequentially changes the positions and the postures of the individual holding tools T1" to Tn" while moving along the extending direction of the feed bar 101R (101L).

In the third embodiment, the X-axis direction linear mechanism (linear-motion mechanism) 1320 and the X-axis linear brake 1321 arranged on the upper surface of the feed bar 101R (101L) in the second embodiment are omitted. There is instead provided a rotation support mechanism configured to support each of the holding tools T1" to Tn" so as to be freely rotatable in a substantially horizontal plane on the upper surface of the feed bar 101R (101L). Other configurations and functions are similar to those of the second embodiment. Therefore, the components are denoted by the same reference symbols, and description of those components is omitted.

Also in the third embodiment, similarly to the first embodiment and the second embodiment, the workpiece conveying tool (workpiece holding tool or workpiece holding apparatus) for a transfer press machine itself does not have a drive ability. As described below, the workpiece conveying tool includes a grip portion, a ball joint portion, a rotation support mechanism, a first arm (swinging mechanism), and a second arm (swinging mechanism). All of those components are driven mechanisms.

Figure 18:
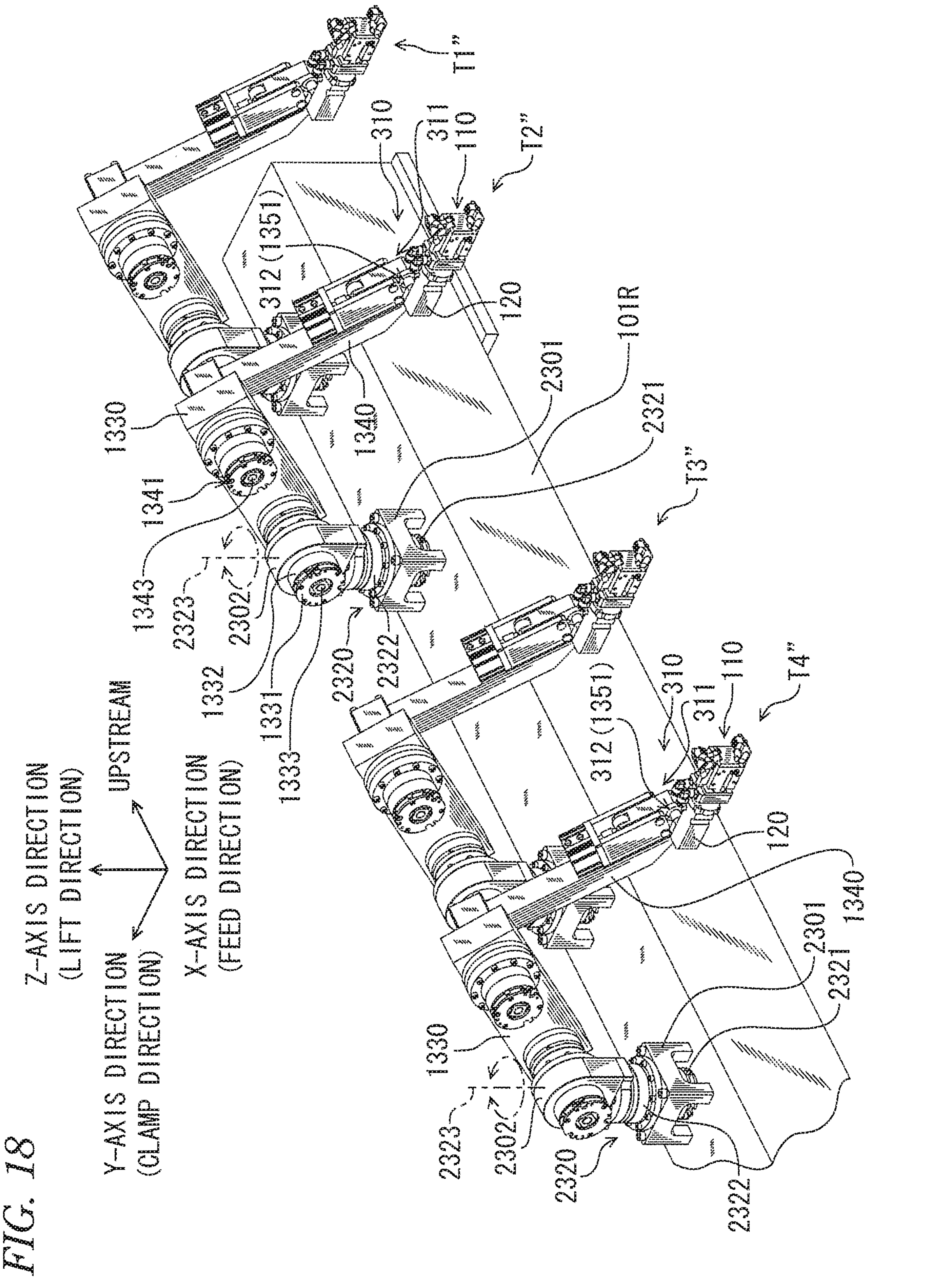
FIG. 18 is a perspective view for illustrating a workpiece holding tool and a feed bar in still another embodiment (third embodiment) of the present invention (perspective view as obliquely seen from above on downstream in the feed direction).

In the third embodiment, as illustrated in FIG. 18, on the upper surface of each of the feed bars 101R and 101L, there is provided a rotation support mechanism 2320 configured to support each of the holding tools T1" to Tn" so as to be freely rotatable in the substantially horizontal plane.

The rotation support mechanism 2320 includes a fixing part on an outer peripheral side thereof, which is supported in a fixed manner to a rotation base portion 2301 fixed to the upper surface of each of the feed bars 101R and 101L, and a rotation movable portion on an inner side thereof, which is mounted on a first-arm support base 2302.

Therefore, in the third embodiment, the first-arm support base 2302 is supported so as to be freely rotatable (turnable or swingable) in the substantially horizontal plane (in other words, freely rotatable about a rotation center axis 2323 (substantially vertical axis)) with respect to the rotation base portion 2301 and eventually each of the feed bars 101R and 101L via the rotation support mechanism 2320.

In this case, there is exemplified a case in which the rotation support mechanism 2320 is mounted on the upper surface of the feed bar 101R (101L). However, the rotation support mechanism 2320 can be mounted on the side surface (substantially vertical surface) or the lower surface (substantially horizontal surface) of the feed bar 101R (101L).

Further, the rotation support mechanism 2320 in the third embodiment includes a rotation base portion brake mechanism 2321 and a rotation base portion speed reduction mechanism 2322 between the rotation base portion 2301 and the first-arm support base 2302, and is configured to enable switching between a state in which the first-arm support base 2302 is freely rotatable about the rotation center axis (substantially vertical axis) 2323 with respect to the rotation base portion 2301 and a state in which the rotation is inhibited.

In this case, the rotation support mechanism 2320 and the rotation base portion brake mechanism 2321 correspond to an example of a rotation support mechanism and an example of a rotation inhibition mechanism configured to inhibit the rotation in the present invention, respectively.

The rotation base portion brake mechanism 2321 can adopt a configuration similar to that of the above-mentioned first-arm brake mechanism 1331.

Configurations other than the rotation support mechanism 2320 and the rotation base portion brake mechanism 2321 are similar to those of the second embodiment, and hence detailed description thereof is omitted.

<Process of Changing Conveying Tool for Transfer Press Machine Itself>

Also in the third embodiment, similarly to the first embodiment and the second embodiment, at the die replacement position X, the workpiece holding tool changing robots (including running carriages) RR1 and RL1 that are movable along the robot running rails 4R and 4L extending along the long-axis direction of the feed bars 101R and 101L change the positions and the postures of the fingers 110 of the holding tools T1" to Tn" in accordance with the size, the shape, and the like of the workpiece to be held.

How to change the positions and the postures of the fingers 110 of the holding tools T1" to Tn" is similar to that in the second embodiment.

Specifically, the grip portion 120 of the holding tool T1" (see FIG. 18) is held (clamped) by the first gripper 201 and the second gripper 202 of the gripper 200 provided to the workpiece holding tool changing robot RR1 as illustrated in FIG. 4 or other figures (corresponding to Step 3 described above). Step 1 and Step 2 are similar to those described in the first embodiment, and hence description thereof is omitted here.

Next (corresponding to Step 4 described above), as illustrated in the pneumatic system diagram of FIG. 11, air pressure (pressurized air) is supplied to the air supply path of the lock system so that actuation of the lock system (ball brake 311, rotation base portion brake mechanism 2321, first-arm brake mechanism 1331, and second-arm brake mechanism 1341) in the holding tool T1" is canceled (friction element of each brake is pressed and returned against an elastic urging force of a spring to release the brake).

That is, this step corresponds to a step of bringing the workpiece holding tool changing system into "a state in which inhibition of the rotation, the swinging, and the change in posture by the rotation inhibition mechanism, the first-arm swinging inhibition mechanism, the second-arm swinging inhibition mechanism, and the posture change inhibition mechanism is canceled" in the present invention.

Subsequently (corresponding to Step 5 described above), similarly to the second embodiment, the workpiece holding tool changing robot RR1 changes the position and the posture of the holding tool T1" by moving the grip portion 120 of the holding tool T1" so that the grip portion 120 achieves a predetermined position and a predetermined posture under control of the controller 500.

That is, along with the operation performed by the workpiece holding tool changing robot RR1 to change the position and the posture of the grip portion 120 of the holding tool T1", the position (position relative to the feed bar 101R) of the finger 110 is moved and changed via the rotation of the rotation support mechanism 2320, the swinging of the first arm 1330, and the swinging of the second arm 1340, and the posture of the finger 110 is freely changed via the ball joint portion 310.

After that (corresponding to Step 6 described above), under a state in which the workpiece holding tool changing robot RR1 holds the grip portion 120 of the holding tool T1", a switching valve switches a path to stop the supply of the air pressure to the air supply path of the lock system illustrated in FIG. 11 to decrease the air pressure in the cylinder. In this manner, the lock system (ball brake 311, rotation base portion brake mechanism 2321, first-arm brake mechanism 1331, and second-arm brake mechanism 1341) in the holding tool T1" is actuated (friction element of each brake is pressed by the elastic urging force of the spring to actuate the brake).

In this manner, the holding tool T1" is brought into a state in which the changed position and the changed posture with respect to the feed bar 101R are held.

That is, this step corresponds to a step of bringing the workpiece holding tool changing system into "a holding state in which the rotation, the swinging, and the change in posture are inhibited by the rotation inhibition mechanism, the first-arm swinging inhibition mechanism, the second-arm swinging inhibition mechanism, and the posture change inhibition mechanism" in the present invention.

The next step (Step 7 described above) and the subsequent steps are performed similarly, and hence description thereof is omitted here.

The workpiece holding tool changing robot RR1 performs such processing for the holding tools T1" to Tn" supported by the feed bar 101R, and the workpiece holding tool changing robot RL1 is controlled by the controller 500 to perform similar processing for the holding tools T1" to Tn" supported by the feed bar 101L.

According to the workpiece holding tool changing system for a workpiece conveying apparatus according to the third embodiment as described above, the holding tools T1" to Tn" themselves do not include drive ability mechanisms including a drive source. The workpiece holding tool changing robot RR1 (RL1) configured to change the positions and the postures of the plurality of holding tools T1" to Tn" sequentially changes the positions and the postures of the individual holding tools T1" to Tn" while moving along the extending direction of the feed bar 101R (101L). Therefore, the tool replacement time can be greatly reduced while the increase in weight of the feed bar 101R (101L) is suppressed. Further, mistakes in adjustment of the position and the posture, which may occur in a case of a manual work by an operator, can be eliminated, which can contribute to enhancement in production efficiency.

Further, according to the third embodiment, the necessity of gathering tools in accordance with the specifications (such as the shape, the size, and the material) of the workpiece to be held is greatly reduced, and hence the space can be saved.

That is, according to the third embodiment, it is possible to provide the workpiece holding tool changing system for a workpiece conveying apparatus of a transfer press machine, which is capable of rapidly and accurately changing the position and the posture of the workpiece holding tool (workpiece holding apparatus) with respect to the feed bar in accordance with the specifications (such as the shape, the size, and the material) of the workpiece to be held without causing mistakes or the like with a relatively simple and low-cost configuration and while increase in weight of the feed bar is suppressed.

In particular, according to the third embodiment, the X-axis direction linear mechanism (linear-motion mechanism) 1320 and the X-axis linear brake 1321 arranged on the upper surface of the feed bar 101R (101L) in the second embodiment are omitted, and there are instead provided the rotation support mechanism 2320 and the rotation base portion brake mechanism 2321 on the upper surface of the feed bar. Further, the first arm 1330 and the second arm 1340 are configured to swing in the substantially vertical plane (in the plane substantially parallel to the Z-axis direction). Therefore, as compared to the case in which the workpiece holding tool is mounted on the side surface of the feed bar as in the first embodiment, the possibility that the workpiece holding tool is brought into contact with the dies is reduced even under the state in which the feed bar is close to the dies. As a result, a space in the clamp direction can be reduced, which can contribute to reduction in installation space of the press line and enhancement of the degree of freedom in installation or the like.

The present invention is not limited thereto, and can adopt a configuration in which the rotation support mechanism 2320 and the rotation base portion brake mechanism 2321 are mounted on the side surface (substantially vertical surface) or the lower surface (substantially horizontal surface) of the feed bar.

As described above, according to the present invention, it is possible to provide a workpiece holding tool changing system for a workpiece conveying apparatus of a transfer press machine, which is capable of rapidly and accurately changing a position and a posture of a workpiece holding tool (workpiece holding apparatus) with respect to a feed bar in accordance with specifications (such as a shape, a size, and a material) of a workpiece to be held without causing mistakes or the like with a relatively simple and low-cost configuration and while increase in weight of the feed bar is suppressed.

The embodiments described above are merely examples for describing the present invention. It goes without saying that various modifications may be made without departing from the gist of the present invention.

What is claimed is:

1. A workpiece holding tool changing system for a workpiece conveying apparatus of a transfer press machine, the workpiece holding tool changing system being configured to change at least one of a relative position and a posture of a workpiece holding tool with respect to a feed bar, the workpiece holding tool being configured to hold a workpiece, the feed bar including at least one workpiece holding tool along a long-axis direction of the feed bar, the feed bar further including, for each workpiece holding tool, at least one set among:

a set of an X-axis direction linear-motion mechanism configured to guide movement of the workpiece holding tool with respect to the feed bar in an X-axis direction corresponding to a feed direction of the workpiece and an X-axis direction movement inhibition mechanism configured to inhibit the movement;

a set of a Y-axis direction linear-motion mechanism configured to guide movement of the workpiece holding tool with respect to the feed bar in a Y-axis direction corresponding to a clamp direction and a Y-axis direction movement inhibition mechanism configured to inhibit the movement;

a set of a Z-axis direction linear-motion mechanism configured to guide movement of the workpiece holding tool with respect to the feed bar in a Z-axis direction corresponding to a vertical direction and a Z-axis direction movement inhibition mechanism configured to inhibit the movement; and a set of a posture changing mechanism configured to change the posture of the workpiece holding tool with respect to the feed bar and a posture change inhibition mechanism configured to inhibit the change in posture, wherein, under a state in which inhibition of one of the movement and the change in posture by one of corresponding one movement inhibition mechanism and the posture change inhibition mechanism is canceled, a workpiece holding tool changing apparatus provided separately from the feed bar changes one of the relative position and the posture of the workpiece holding tool to one of a desired relative position and a desired posture with respect to the feed bar, and wherein, after the change, the workpiece holding tool changing system is brought into a holding state in which the one of the movement and the change in posture is inhibited by the one of the corresponding one movement inhibition mechanism and the posture change inhibition mechanism.

2. A workpiece holding tool changing system for a workpiece conveying apparatus of a transfer press machine, the workpiece holding tool changing system being configured to change at least one of a relative position and a posture of a workpiece holding tool with respect to a feed bar, the workpiece holding tool being configured to hold a workpiece, the feed bar including at least one workpiece holding tool along a long-axis direction of the feed bar, the feed bar further including, for each workpiece holding tool, a set of an X-axis direction linear-motion mechanism configured to guide movement of the workpiece holding tool with respect to the feed bar in an X-axis direction corresponding to a feed direction of the workpiece and an X-axis direction movement inhibition mechanism configured to inhibit the movement, each workpiece holding tool being supported by the feed bar via:

a first arm having a proximal end portion that is supported by a first-arm support base supported by the X-axis direction linear-motion mechanism, so as to be swingable in a substantially vertical plane via a first joint;

a second arm having a proximal end portion that is supported on a distal end side of the first arm so as to be swingable in the substantially vertical plane via a second joint; and a posture changing mechanism provided on a distal end side of the second arm and configured to change the posture of the workpiece holding tool with respect to the feed bar, each workpiece holding tool including:

a first-arm swinging inhibition mechanism configured to inhibit swinging of the first arm about the first joint;

a second-arm swinging inhibition mechanism configured to inhibit swinging of the second arm about the second joint; and a posture change inhibition mechanism configured to inhibit change in posture by the posture changing mechanism, wherein, under a state in which inhibition of the movement, the swinging, and the change in posture by the X-axis direction movement inhibition mechanism, the first-arm swinging inhibition mechanism, the second-arm swinging inhibition mechanism, and the posture change inhibition mechanism is canceled, a workpiece holding tool changing apparatus provided separately from the feed bar changes one of the relative position and the posture of the workpiece holding tool to one of a desired relative position and a desired posture with respect to the feed bar, and wherein, after the change, the workpiece holding tool changing system is brought into a holding state in which the movement, the swinging, and the change in posture are inhibited by the X-axis direction movement inhibition mechanism, the first-arm swinging inhibition mechanism, the second-arm swinging inhibition mechanism, and the posture change inhibition mechanism.

3. A workpiece holding tool changing system for a workpiece conveying apparatus of a transfer press machine, the workpiece holding tool changing system being configured to change at least one of a relative position and a posture of a workpiece holding tool with respect to a feed bar, the workpiece holding tool being configured to hold a workpiece, the feed bar including at least one workpiece holding tool along a long-axis direction of the feed bar, the feed bar further including, for each workpiece holding tool, a set of a rotation support mechanism configured to support the workpiece holding tool in a freely rotatable manner in a plane substantially parallel to one of a substantially horizontal plane and a substantially vertical plane of the feed bar and a rotation inhibition mechanism configured to inhibit the rotation, each workpiece holding tool being supported by the feed bar via:

a first arm having a proximal end portion that is supported by a first-arm support base supported by the rotation support mechanism, so as to be swingable in the substantially vertical plane via a first joint;

a second arm having a proximal end portion that is supported on a distal end side of the first arm so as to be swingable in the substantially vertical plane via a second joint; and a posture changing mechanism provided on a distal end side of the second arm and configured to change the posture of the workpiece holding tool with respect to the feed bar, each workpiece holding tool including:

a first-arm swinging inhibition mechanism configured to inhibit swinging of the first arm about the first joint;

a second-arm swinging inhibition mechanism configured to inhibit swinging of the second arm about the second joint; and a posture change inhibition mechanism configured to inhibit change in posture by the posture changing mechanism, wherein, under a state in which inhibition of the rotation, the swinging, and the change in posture by the rotation inhibition mechanism, the first-arm swinging inhibition mechanism, the second-arm swinging inhibition mechanism, and the posture change inhibition mechanism is canceled, a workpiece holding tool changing apparatus provided separately from the feed bar changes one of the relative position and the posture of the workpiece holding tool to one of a desired relative position and a desired posture with respect to the feed bar, and wherein, after the change, the workpiece holding tool changing system is brought into a holding state in which the rotation, the swinging, and the change in posture are inhibited by the rotation inhibition mechanism, the first-arm swinging inhibition mechanism, the second-arm swinging inhibition mechanism, and the posture change inhibition mechanism.

4. A workpiece holding tool changing system for a workpiece conveying apparatus of a transfer press machine according to claim 1, wherein the workpiece holding tool changing apparatus is configured to change one of the relative position and the posture of a corresponding workpiece holding tool to one of a desired relative position and a desired posture with respect to the feed bar through engagement with a single engaging portion of the corresponding workpiece holding tool.

5. A workpiece holding tool changing system for a workpiece conveying apparatus of a transfer press machine according to claim 2, wherein the workpiece holding tool changing apparatus is configured to change one of the relative position and the posture of a corresponding workpiece holding tool to one of a desired relative position and a desired posture with respect to the feed bar through engagement with a single engaging portion of the corresponding workpiece holding tool.

6. A workpiece holding tool changing system for a workpiece conveying apparatus of a transfer press machine according to claim 3, wherein the workpiece holding tool changing apparatus is configured to change one of the relative position and the posture of a corresponding workpiece holding tool to one of a desired relative position and a desired posture with respect to the feed bar through engagement with a single engaging portion of the corresponding workpiece holding tool.

7. A workpiece holding tool changing system for a workpiece conveying apparatus of a transfer press machine according to claim 1, wherein the transfer press machine includes a moving bolster, and wherein, under a state in which the moving bolster and the feed bar are removed from the transfer press machine to an outside, the workpiece holding tool changing apparatus changes one of the relative position and the posture of the workpiece holding tool to one of the desired relative position and the desired posture with respect to the feed bar, and the workpiece holding tool changing system is shifted to the holding state after the change.

8. A workpiece holding tool changing system for a workpiece conveying apparatus of a transfer press machine according to claim 2, wherein the transfer press machine includes a moving bolster, and wherein, under a state in which the moving bolster and the feed bar are removed from the transfer press machine to an outside, the workpiece holding tool changing apparatus changes one of the relative position and the posture of the workpiece holding tool to one of the desired relative position and the desired posture with respect to the feed bar, and the workpiece holding tool changing system is shifted to the holding state after the change.

9. A workpiece holding tool changing system for a workpiece conveying apparatus of a transfer press machine according to claim 3, wherein the transfer press machine includes a moving bolster, and wherein, under a state in which the moving bolster and the feed bar are removed from the transfer press machine to an outside, the workpiece holding tool changing apparatus changes one of the relative position and the posture of the workpiece holding tool to one of the desired relative position and the desired posture with respect to the feed bar, and the workpiece holding tool changing system is shifted to the holding state after the change.

10. A workpiece holding tool changing system for a workpiece conveying apparatus of a transfer press machine according to claim 4, wherein the transfer press machine includes a moving bolster, and wherein, under a state in which the moving bolster and the feed bar are removed from the transfer press machine to an outside, the workpiece holding tool changing apparatus changes one of the relative position and the posture of the workpiece holding tool to one of the desired relative position and the desired posture with respect to the feed bar, and the workpiece holding tool changing system is shifted to the holding state after the change.

* * * * *